(12) United States Patent
Burns et al.

(10) Patent No.: US 9,781,913 B2
(45) Date of Patent: Oct. 10, 2017

(54) THERAPEUTIC SUPPORT HORSESHOE

(71) Applicants: Curtis J. Burns, Wellington, FL (US); Scott Edward Morrison, Georgetown, KY (US)

(72) Inventors: Curtis J. Burns, Wellington, FL (US); Scott Edward Morrison, Georgetown, KY (US)

(73) Assignee: No Anvil LLC, Wellington, FL (US)

( * ) Notice: Subject to any disclaimer, the term of this patent is extended or adjusted under 35 U.S.C. 154(b) by 619 days.

(21) Appl. No.: 13/843,754

(22) Filed: Mar. 15, 2013

(65) Prior Publication Data

US 2013/0277070 A1    Oct. 24, 2013

Related U.S. Application Data

(63) Continuation-in-part of application No. 12/806,244, filed on Aug. 6, 2010, now Pat. No. 8,408,320.

(51) Int. Cl.
*A01L 5/00* (2006.01)
*A01L 3/00* (2006.01)

(52) U.S. Cl.
CPC .. *A01L 5/00* (2013.01); *A01L 3/00* (2013.01)

(58) Field of Classification Search
CPC ..................................... A01L 5/00; A01L 3/00
USPC ................................. 168/4, 12, 13, 28, 6, 10
See application file for complete search history.

(56) References Cited

U.S. PATENT DOCUMENTS

| | | | | |
|---|---|---|---|---|
| 246,928 A * | 9/1881 | Watts | | 168/11 |
| 464,845 A * | 12/1891 | Bedlington | | 36/73 |
| 508,142 A * | 11/1893 | Liebert | | 168/13 |
| 560,119 A * | 5/1896 | Boehmer | | 168/14 |
| 598,482 A * | 2/1898 | Paar | | 168/13 |
| 608,156 A * | 7/1898 | Paar | | 168/13 |
| 610,804 A * | 9/1898 | Evans | | 168/13 |
| 630,204 A * | 8/1899 | Evans | | 168/13 |
| 631,147 A * | 8/1899 | Beardsley et al. | | 168/13 |
| 640,166 A * | 12/1899 | Patrick | | 168/13 |
| 643,272 A * | 2/1900 | Paar | | 168/13 |
| 778,909 A * | 1/1905 | Simmons | | 168/13 |
| 904,193 A * | 11/1908 | Filliez | | 168/13 |
| 943,146 A * | 12/1909 | Filliez | | 168/13 |
| 6,868,914 B2 * | 3/2005 | Kolonia, Sr. | | 168/14 |
| 7,685,801 B2 * | 3/2010 | Brisson | | 59/61 |
| 2010/0294517 A1 * | 11/2010 | Poupard | | 168/12 |

* cited by examiner

*Primary Examiner* — Son T Nguyen
(74) *Attorney, Agent, or Firm* — John F. Vodopia

(57) ABSTRACT

A therapeutic support horseshoe includes a resilient, flexile moldable material formed in a U shape with an anterior segment from which opposing first and second side segments continuously extend to opposing caudal ends separated as an open heel and a pliable, metal rod-like reinforcer embedded in the flexile moldable material between opposing hoof-contacting and ground-contacting surfaces, the reinforcer extending from one caudal end, through the anterior segment, to the other caudal end of the horseshoe. The horseshoe so formed includes an inner side surface and an outer side surface between the opposing hoof-contacting and ground-contacting surfaces a slot formed in the inner side surface, approximately halfway between the opposing hoof-contacting and ground-contacting surfaces, and extending from the one caudal end to the other caudal end.

15 Claims, 8 Drawing Sheets

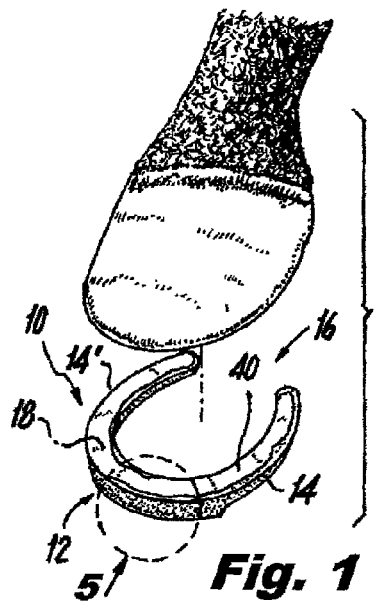
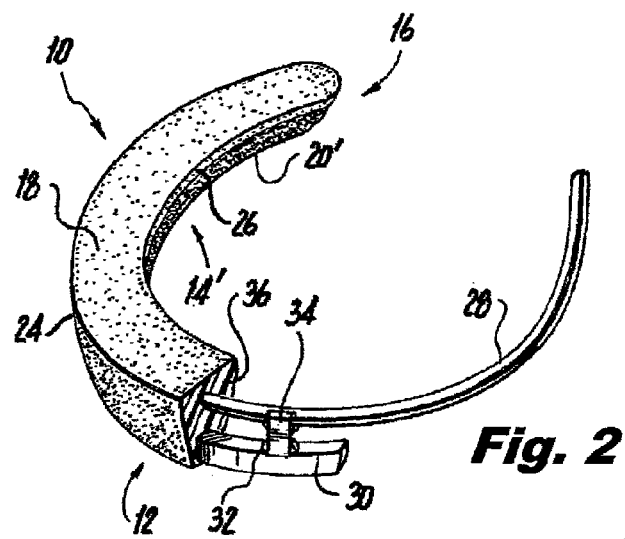
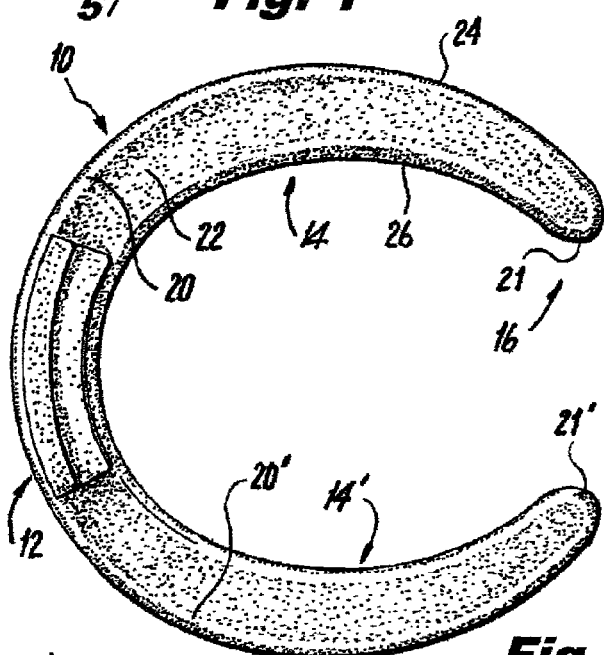
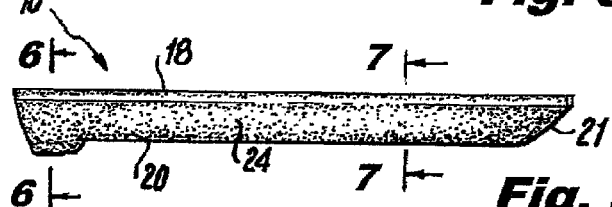
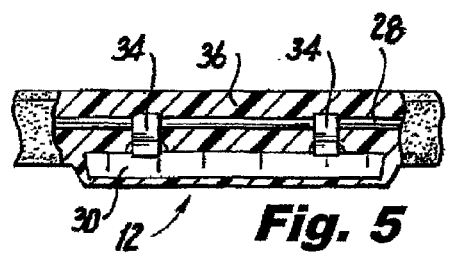
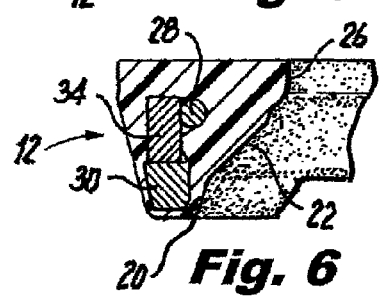
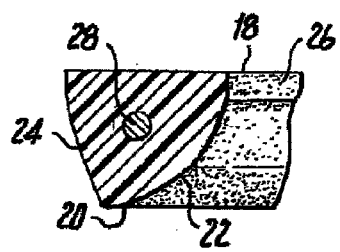
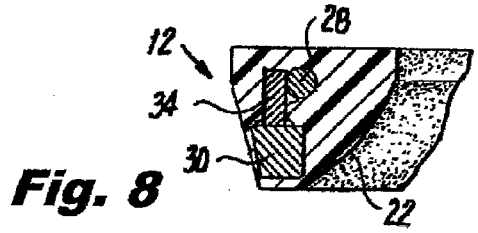
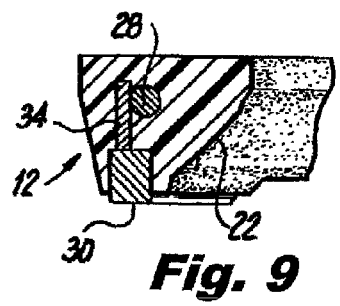

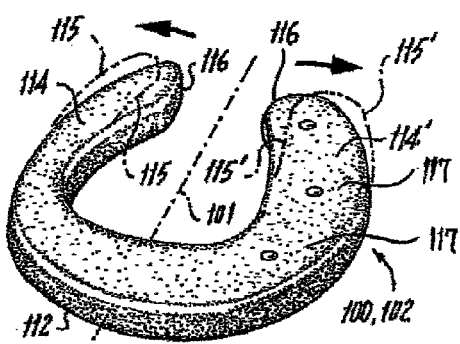
Fig. 20
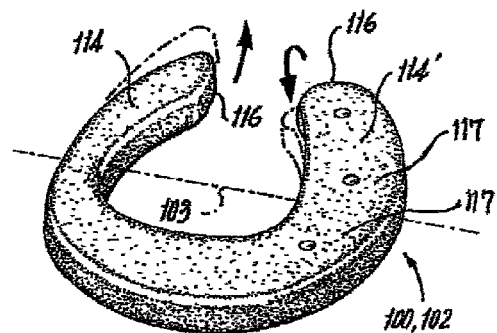
Fig. 21
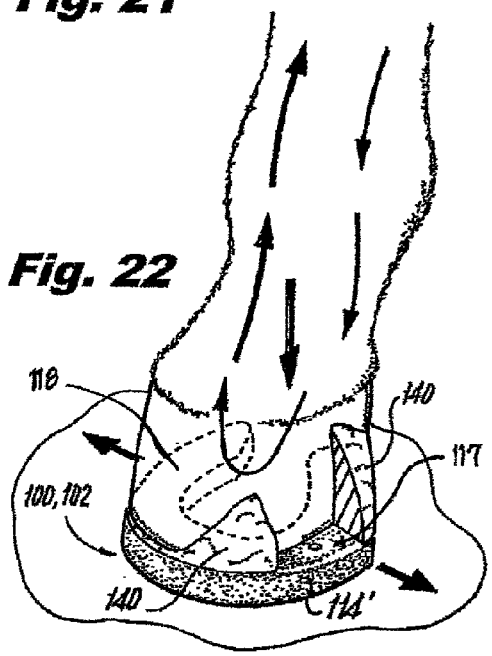
Fig. 22
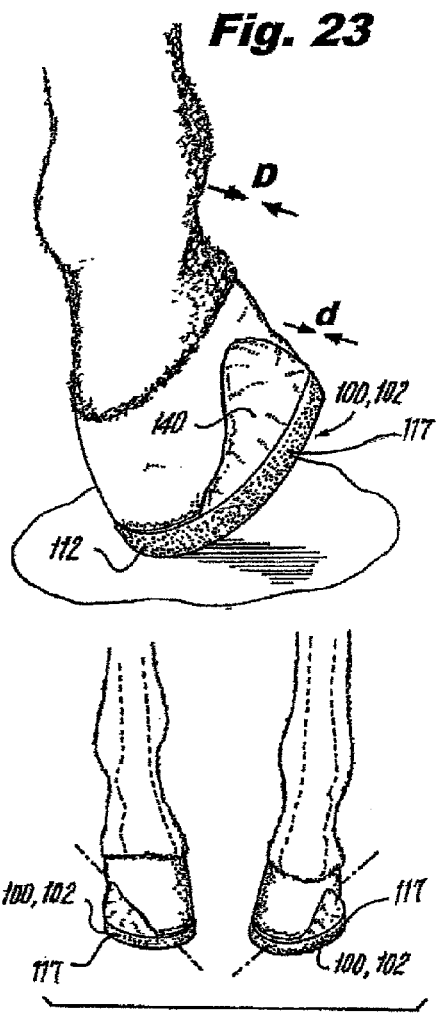
Fig. 23
Fig. 24
Fig. 25
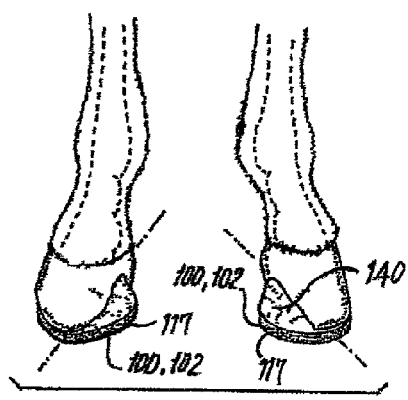

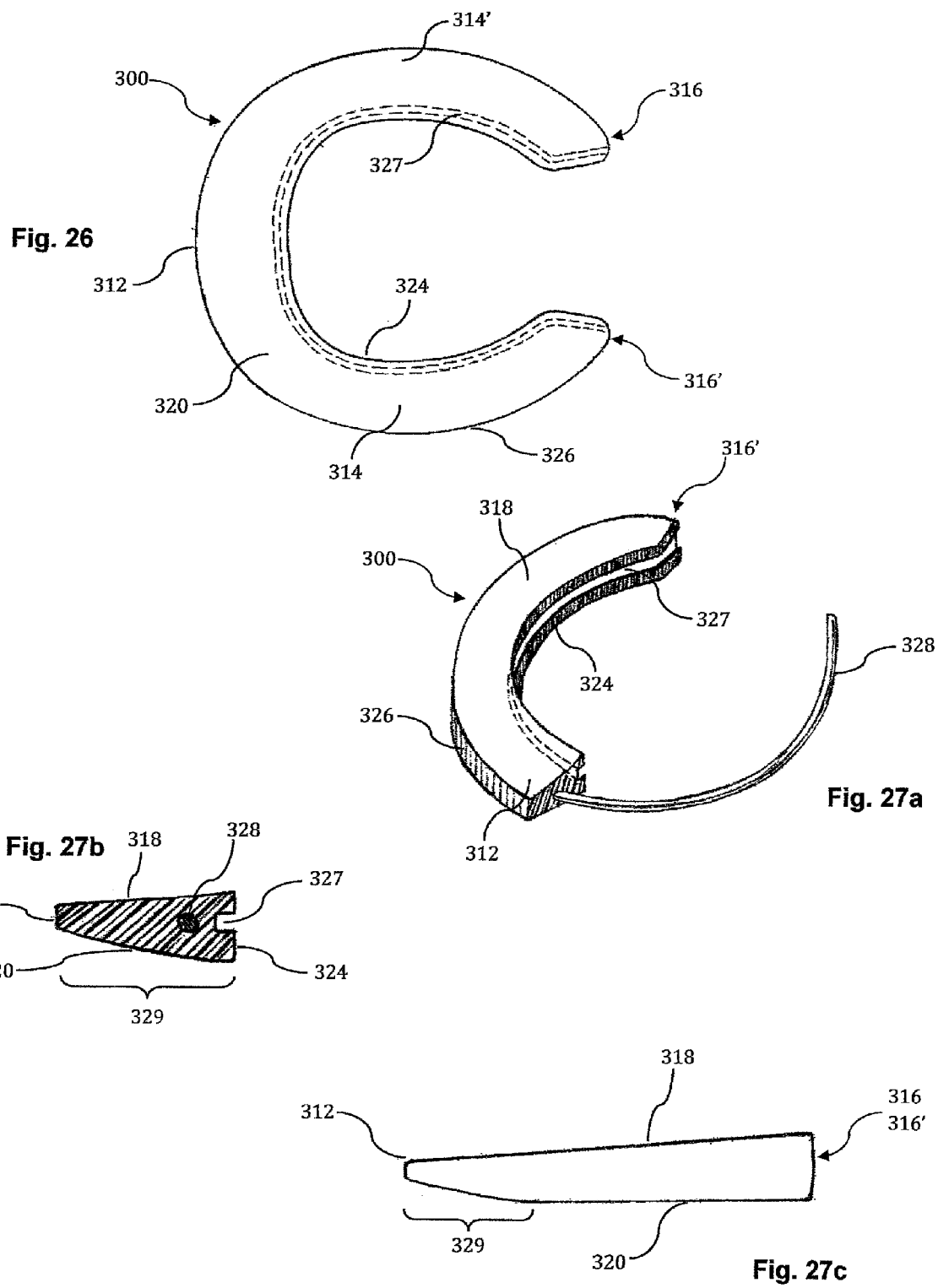

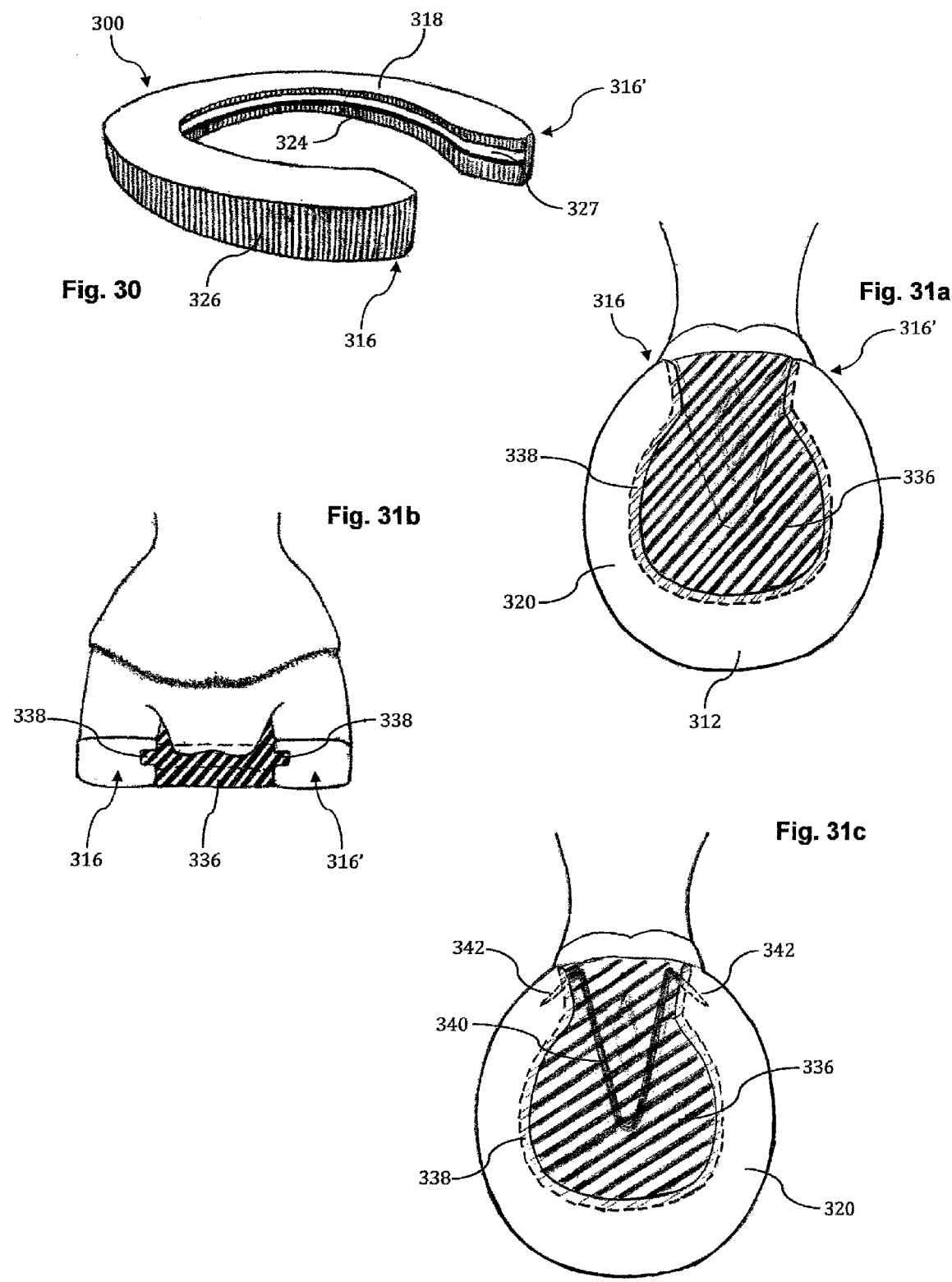

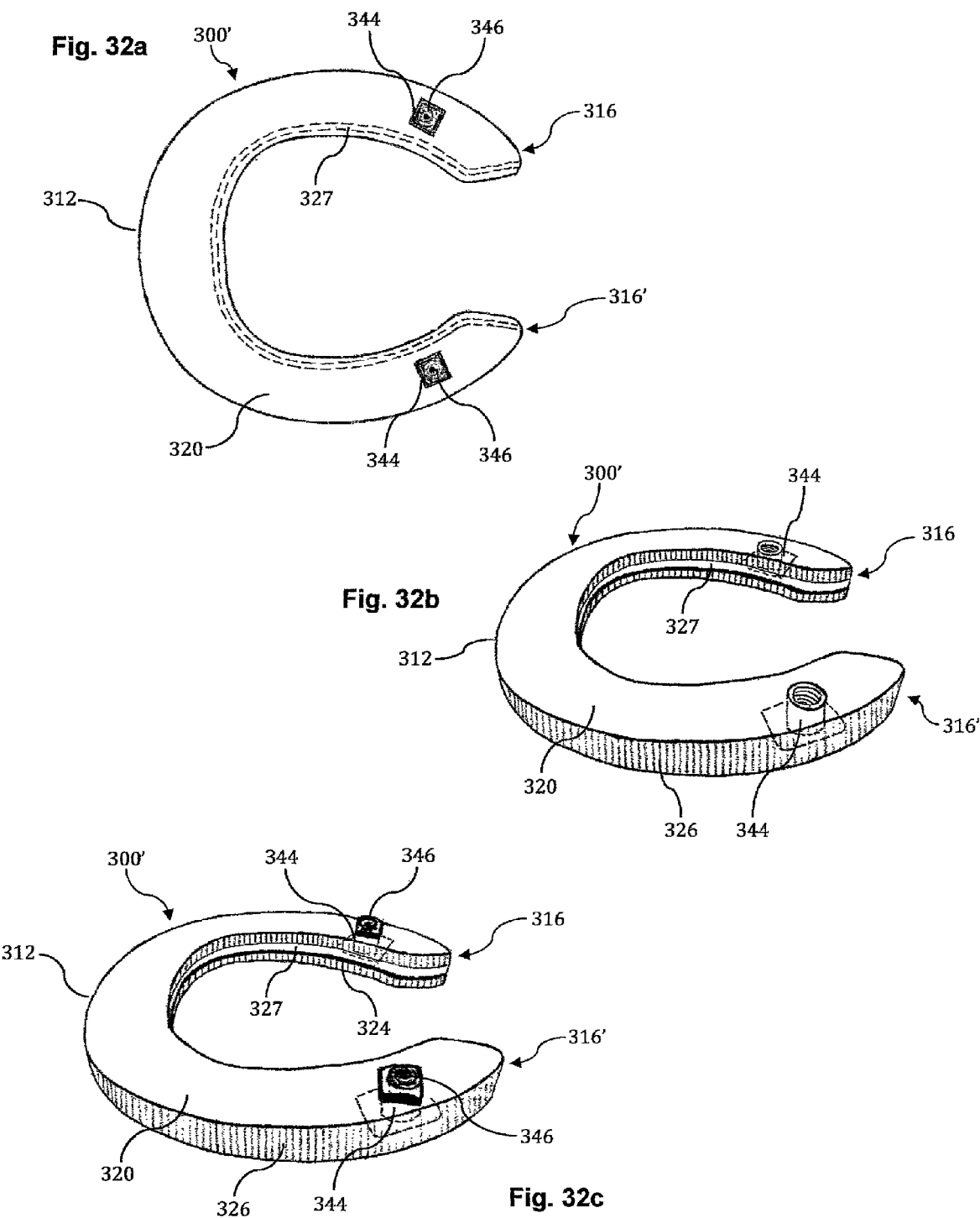

THERAPEUTIC SUPPORT HORSESHOE

CROSS-REFERENCE TO RELATED APPLICATION

This application is a continuation-in-part (CIP) application of U.S. patent application Ser. No. 12/806,244, filed Aug. 6, 2010 (the "parent"), which parent is itself a continuation-in-part (CIP) of U.S. patent application Ser. No. 11/481,438, filed Jul. 6, 2006 (the "grandparent"); this CIP application claims priority from the parent and the grandparent under 35 USC §120, where the grandparent claims priority under 35 USC §120 from U.S. Provisional Patent Application 60/697,414, filed Jul. 8, 2005.

BACKGROUND OF THE INVENTION

The present invention broadly relates to protective coverings for equine hooves and, more particularly relates to a therapeutic support horseshoe made from non-metallic polymeric material formed to include an inner side surface and an outer side surface between the opposing hoof-contacting and ground-contacting surfaces a slot formed in the inner side surface, approximately halfway between the opposing hoof-contacting and ground-contacting surfaces, and extending from the one caudal end to the other caudal end.

Wild horses rarely suffer from lameness unless they are injured in some way. This is true mainly due to the fact that they are constantly on the move, run on uneven ground, stand in water and otherwise are exposed to environmental factors which wear away the hoof in the manner in which nature intended. The hoof mechanism in its natural state is designed to be a shock absorber as well as a vital aid to the circulatory system. When in motion, on contact with the ground surface, the digital cushion is compressed between the pastern bone and the sensitive frog and redirects the remainder of the force outwards and upwards to the lateral cartilages (attached to the sides of the coffin bone). The foot will expand and the sole will widen, this expansion absorbs shock and also permits the coffin bone to lower which in turn brings blood flow to the area. As the foot is lifted in stride it contracts forcing the blood out of the foot and up the leg as the foot hits the ground on the next stride. Not only does the entire structure of the foot benefit from increased circulation this process is fundamental for the health and well-being of the horse.

Domesticated horses are not so lucky. They are exposed to much less uneven terrain and spend a great deal more time confined to stalls where movement is prohibited as the average stall is 11'×11'. They are protected from the more harsh and abrasive aspects of nature. Furthermore, special feeds which create other desirable conditions in domesticated horses may have a harmful effect on the feet. Therefore, it has long been recognized that special care is required to maintain domesticated horses' feet in proper condition. Horseshoes are used for this purpose.

Traditionally over the years most domesticated horses have been and are currently shod with shoes made of metal such as steel or aluminum alloys.

Horseshoes are typically secured to hooves by nails. The nails pass through holes in a horseshoe and are driven into the horn wall of the hoof, or hard keratinous portion. Great care must be taken in directing the nail into the hard keratinous portion so as to prevent injury to the horse. The nails are driven at an angle away from the center of the hoof, the nail points extend through the outer side wall of the hoof where they are cut off and clinched or hammered against the hoof.

Aluminum alloys are most commonly used today in racing and are characterized by efficient application, relatively low weight and expense. Horses engaged in competition training or racing are commonly re shod every three to six weeks depending on the individual's hoof growth. This is done in consideration of the weakened clinches (nails), but primarily by the desire to maintain healthy geometry with respect to the configuration of the foot and so facilitate optimal biomechanics, or way of going. As a result of the natural flexion and movement of the foot over time the nails work loose and the clinches become raised, which can often lead to a horse dislodging a shoe or shoes. This event can result in damage to the hoof wall when the clinched nails are pulled through the wall of the hoof or more disastrous if the shoe is not pulled off cleanly the horse may step on exposed nail ends damaging the sole or frog or further damage a leg with the dislodged shoe.

Frequent removal and reattachment of shoes makes numerous nail holes in the hoof walls. There is always a possibility of error when driving a nail, if driven too close to the white line it can be very painful for a horse leading to lameness and possibly abscesses. If there is insufficient new healthy horn growth two problems arise. First, with numerous nail holes already in the hoof wall, it can be difficult or sometimes impossible to secure a new shoe. Second, the abundance of nail holes lets in bacteria, dries out the hoof wall, damages the corium (vascular tissue that supplies nourishment to the hoof) and generally weakens the hoof structure, which can lead to failure of the wall and damage to the horse's hoof and foot. Thus, the well-known phrase, no foot no horse, prevails.

The surfaces on which horses train and perform vary widely. Horses frequently train and compete on grass, dirt, sand, cinder, crushed stone, and sometimes on packed surfaces which nearly approach the hardness of asphalt or cement. The hardness of the training or racing surfaces can greatly increase the effective rate of loading, thus the shock and vibration, e.g., the peak g forces which the horse will experience. The shock and vibration transmitted to a horse's anatomy is intensified by metal shoes and can directly affect a horse's efficiency, athletic performance and the amount of trauma that will be experienced.

Accordingly, it can be readily understood that the potential for injury is large whenever horses train or race on hard surfaces. Horses are best trained by placing them into open paddocks and training them on forgiving yet not unstable natural surfaces. Clearly, no single factor can so greatly affect the level of stress being placed upon a horse, as can the training or racing surface and overall training program. In Thoroughbred or Standardbred racing, trainers have very few alternatives other than utilizing a racetrack for daily training.

It is known that the foot of an active unshod horse living in a natural environment will wear such that the front and back of the hoof become gently rounded. In fact, horseshoes which are initially substantially rectangular in cross-section will wear in these areas and eventually enable the combination of a horse's foot and horseshoe to assume a somewhat similar shape. Unfortunately, many conventional horseshoes are so constructed as to require replacement by the time this more natural configuration is attained.

It is also known that the hoof of an active unshod horse living in a natural environment will assume a slightly concave shape in the toe area between the medial and lateral sides, as when viewed from the front, but also along both sides of the hoof between the toe and heel. This configuration permits the hoof to better slide or plane over the ground support surface during the braking phase as impact takes place, thereby reducing the effective rate of loading and the shock and vibration experienced.

Further, this configuration permits the hoof to better grab the surface during the later propulsive phase, and to break over and make a faster transition during toe-off, thus enhancing stride frequency and exhibited speed. The ability of the horse's hoof to slide somewhat can also enhance stability relative to a situation in which a horse's foot would suddenly catch or grab the ground support surface, as can happen with the use of horseshoes having rectangular configurations which possibly further include toe grabs, raised traction members or cleats. Of course, the presence of extremely loose or slippery ground can neutralize the possible adverse effects of such traction devices, and in fact, such may provide better performance and safety in such circumstances.

As mentioned, it is known that in the unshod natural state, a horse's foot and hoof will flex and slightly widen when under load forces. It follows that use of relatively rigid metal or aluminum horseshoes substantially prevents this natural movement and so tends to reduce both the effective size, and the shock and vibration absorbing capability of a horse's foot. A steel horseshoe is known to be more forgiving in this regard than an aluminum horseshoe. For that matter, it is believed that the occurrence of hoof cracks is sometimes caused by the flexing and widening action of the foot and hoof working against the nails associated with a substantially inflexible horseshoe. Inflexible horseshoes also are known to prevent the natural wearing of the hoof, which can result in contraction and inflammation of the foot.

Non-metallic materials such as plastic or rubber are sometimes used in combination with a metal horseshoe and such hybrid products are generally referred to in the industry as bonded horseshoes.

Plastic and rubber materials have been chemically and/or mechanically bonded to metal shoes to create various configurations, e.g., these materials have been used between upper and lower metal layers of a horseshoe, between the horseshoe and the hoof, on the ground engaging portion of a horseshoe, and to completely encapsulate a metal horseshoe.

Although some shock or vibration may be relieved through these alternatives, the rigidity of the metal shoe is still present as is the damaging effect of the nails.

Horseshoes made entirely of plastic material are known. Most, if not all, plastics-fabricated horseshoes currently on the market, however, suffer from the disadvantage that they are time-consuming and awkward to apply, particularly those that have to be assembled from a kit of parts or require special equipment. The composition of plastic horseshoes varies widely with some being as restrictive as a metal horseshoe. And while some inventions teach methods where a person without farrier skills can attach the hoof covering, equine hooves require particular preparation prior to shoe application such that unknowledgeable trimming or rasping and handling of some equipment can realize disastrous results. For that matter, such unskilled farrier practice on most Thoroughbred horses, especially those in intensive training programs, can easily result in injury.

Furthermore, some glue-on horseshoes currently on the market require attaching the glue-on horseshoe using side extensions such as tabs or fabric cuffs which extend up the sidewall of the hoof. Gluing to a sidewall presents special problems, principally because bonds there can be subjected to very high tensile forces when a horse pivots, and bonds are usually weakest in tension. In addition, for horses with thin hoof walls, such as many Thoroughbreds have, when gluing side extensions the high heat (hoof adhesives heat up significantly when curing) can produce discomfort for the horse. The hoof wall is almost encapsulated by these extensions and adhesive, creating unnatural conditions which can be detrimental to the health of the horse's foot.

For that matter, it is time consuming to fit such a shoe, wasteful of material, and requires a number of parts to be supplied for each shoe. For the next shoeing, the tabs can prove extremely difficult to remove from the upper hoof wall, causing discomfort for the horse and extra time spent prepping the hoof for the fitting of new shoes.

Prior art has not recognized a product made from a plastics material which is widely accepted by trainers of performance horses. The foregoing illustrates limitations known to exist in present horseshoes. Thus, it is apparent that it would be advantageous to provide an alternative directed to overcoming the limitations set forth above.

The present invention offers a solution where prior art has failed. Two of the foremost problems are addressed by the invention, the eradication of a rigid shoe and nails as the form of attachment. For example, the invention provides horseshoes which conform to the foot imitating the known configuration which healthy, active, unshod horses acquire when living in a natural environment. The horseshoes are configured with a degree of hardness closely resembling the natural composition of the equine hoof that permits natural flexing and widening of the foot and horseshoe when under load forces.

The horseshoes offer many advantages including without limitation a significant reduction of trauma and stress subjected to the horse's skeletal and muscular system when under load forces and improved circulatory system thus enhanced performance and health of the horse.

Due to the characteristics of the present invention, a self-levelling effect in the horseshoe is achieved. That is, in horses shod with the inventive horseshoes, as new horn is regenerated over the course of a few weeks, the horseshoe gradually wears, resulting in a longer period of optimal biomechanics before the next shoeing. The heels are allowed to drop naturally as they grow avoiding the jammed up effect which can often lead to quarter cracks.

The invention also provides an improved method of attaching a horseshoe using adhesives, which eliminates nails, promotes stronger, healthier horn regeneration and removes the element of error when driving nails. The horseshoes can be easily and efficiently attached or removed by a farrier in the field, as it may be cut, rasped, sanded or ground down using regular farrier tools. For that matter, the horseshoes considerably reduce occurrence of diseases and detrimental conditions of the foot, e.g. laminitis, navicular syndrome, white line disease and quarter cracks.

The inventive horseshoes are easily fitted to a foot having a given shape and width by cold forming without the need for special equipment. The horseshoes are neither bulky nor obtrusive, are light and comfortable for the horse and being attached by adhesive guards against dislodgment regardless of the direction of frictional force on the shoe relative to the hoof. For that matter, field testing has proven its strength and resilience by 6 weeks of continued attachment on a Thoroughbred racehorse in an intensive training program, producing winners on racing surfaces, dirt, synthetic and turf.

The invention includes one or more embodiments of therapeutic horseshoes configured for use in treating angular deformities and/or for compensating for various deleterious effects to the foot and hoof that can sometimes occur during known treatments for serious angular deformities.

Various limb deformities in foals, weanlings and yearlings, including angular deformities, can be treated at an early stage surgically and/or with foot care to correct the deformity or at least improve the prognosis as the horse matures. Angular limb and flexure deformities are common limb abnormalities manifest in foals that require early recognition and treatment. Foals with angular limb deformities, i.e., valgus and varus deformities, have traditionally been referred to as "knock-kneed" or "bow-legged" in the front limbs. A valgus deformity is defined as a deviation of the limb away from the midline (knock-kneed). A varus deformity is a deviation of the limb toward the midline (bow-legged). The most common location of angular limb deformity is the carpal joint (knee).

As is known, a growing horse's foot changes shape in response to weight distribution and varying a weight distribution. A side of the hoof that is lined up closer to the vertical line of force (bone column) develops a straighter vertical wall and the opposite site develops a more sloping wall and in more severe cases, develops a flare. As the vertical wall becomes more vertical it fails to provide adequate support. In some cases, the wall collapses or contracts beyond vertical and in extreme cases is known to fold over axially. These effects can propagate a cycle of distortion and imbalance having the related effect of worsening the angular deformity which caused the original problem.

For example, in a case of carpal valgus, the medial wall of the affected limb is lined up closer to the vertical line of force (plum line dropped from point of shoulder). As such, the medial wall receives more load and becomes straighter while the lateral wall (which is under loaded vertically) becomes flared or more sloping. Additionally, the region of the foot under the most load grows the slowest. Hence, the lateral wall in this case (less vertical load) grows faster and the medial wall slower, with time. Between trimmings the limb consequently becomes more valgus as the hoof capsule distortion pulls the limb out.

Foot management techniques are aimed at building and maintaining a healthy foot (base of support), where more severe cases require trimming and the addition of an extension. An extension can be an epoxy or acrylic patch with Kevlar fabric that is placed in the heel quarter and extended to a plum line dropped from the condyle of MC/MT III to the ground. Extensions are made out of acrylic, that is, built up around the side of the hoof wall and molded outwards to create an extension. Such extensions, however, create a lever effect on the hoof wall and can create flares and hoof wall separation, as described above.

Treatments using extensions, and the limitations of same, are described in detail within a publication by Scott Morrison, DVM; Morrison, S., FOAL FOOT CARE, CanWest Conference, Oct. 17-20, 2009. Dr. Morrison's disclosure indicates that extension shoes, as an alternative to an acrylic/Kevlar extension, do not pull on a focal area as much as an extension and better distribute the leverage over a larger area. Dr. Morrison explains that while various shoe types can be used to create an extension shoe, aluminum is most common where the extension is directly glued to the bottom of the hoof.

Dr. Morrison explains, however, that while such aluminum shoes are helpful with wide feet, directly gluing such a shoe on a foal foot constricts the hoof to some degree and likely creates a mild heel contracture. Dr. Morrison posits that an indirect gluing method is probably the most effective and least damaging means for gluing an extension shoe, which allows heel expansion and constricts the hoof minimally, if at all. Dr. Morrison then discusses the Sigafoos' series gluing system, wherein flexible fiberglass fabric is adhered to the shoe and the wall to provide a flexible attachment to the shoe.

Such techniques may be said to frequently realize an entirely contracted hoof (i.e., mule footed), which provides poor limb support. At other times, only a half-contracted hoof, usually medially on a valgus deformity and laterally on a varus deformity. Dr. Morrison indicates that there is benefit from widening the foot to a normal shape or widening the contracted half to so that it is pulled out beyond vertical, which is known to be accomplished by use of hinged spring shoes.

A medial extension on one side and toward the back of the foot will support the overloaded side of the limb, i.e., will move the plane of support toward the midline to allow a more even distribution of weight over the support surface. This has the effect of promoting centerline breakover. Extensions constructed from poly methylmethacrylate (Equilox®) and fiberglass are applied directly to the foot by the veterinarian, and shaped to the desired width to provide the exact amount of correction. The extension is trimmed by the veterinarian like normal hoof as the foot grows or additional applications are applied as deemed necessary.

There are significant problems in the use of solid inflexible extension horseshoes, for example, aluminum. The hoof is unable to flex naturally, and change with the redistribution of weight. That is, by fixing the hoof directly to all inflexible surface (as discussed above), the ability of the actively developing young hoof can be inhibited. The inability of a developing hoof to flex limits blood circulation and supply therein, which is so important to the developing hoof of foals, weanlings and yearlings, particularly when the treatment end is to stimulate the limb growth plates without sacrificing the hoof development.

Furthermore, as the developing hoof grows, the rigid extension horseshoes must be changed on a regular basis to allow for these changes. Anytime these therapeutic applications are applied and removed on a regular basis there is hoof wall removed, in some cases more than is being generated (horn growth), particularly with indirect glue cuff shoes (such as taught by Sigafoos, as discussed above) that encapsulate the foot, hoof wall is degraded through the duration of wear and at re-application where hoof wall is removed to prep the surface for a new horseshoe. The therapeutic extension horseshoe as it adapts to the changing young hoof can be left on for longer periods of time.

For that matter, while the problem of wear tends to be insignificant in hard metal extension shoes, extensions made from acrylics, etc., may wear unevenly. And while uneven wear may not significantly affect the foot, per se, it may have a limiting effect on the intended improvement. That is, wear can limit the therapeutic effectiveness of a therapeutic extension shoe.

Laminitis

Laminitis is a disease of the tissue connecting the coffin bone to the inner hoof wall. This tissue is dependent upon continuous blood flow and a supply of nutrients (such as glucose) to maintain this vital attachment. Any process which alters the supply of blood and nutrients to this tissue can initiate the disease process. Laminitis may affect any breed or age of horse, although it is far less common in foals. Laminitis can occur in an individual limb or may affect multiple limbs.

There are many causes of laminitis in the horse. One of the most common causes is carbohydrate overload or "grain founder." Another common cause of laminitis is endocrine/metabolic disorders. This includes equine Cushing's disease, metabolic syndrome, and insulin resistance. Horses which are severely ill due to some type of systemic disease such as pneumonia, colitis, or endometritis may also develop laminitis. Finally, horses can develop laminitis in a supporting limb if they are very lame on the opposite limb. The foot requires frequent loading and unloading to maintain blood flow. For example, if a case is uncomfortable on the right front limb due to a fractured bone or a serious lameness, the horse will only bare weight on the left limb, and will not intermittently shift weight or unload the foot. Over time, this horse may develop laminitis (from lack of normal perfusion) in the left front limb.

Laminitis can be broken down into several stages. The first is the developmental stage in which trigger factors are released and blood flow changes to the foot occur. This phase is usually set in motion by some other systemic ailment. The laminae are not compromised at this stage. The horse then enters the acute phase. This is defined as the onset of foot pain and at this point an increased digital pulse is easily detected. Most horses then enter the subacute phase and recover with conservative treatment as long as the inciting cause has resolved. The others enter the chronic phase, which is defined as greater than 72 hours of foot pain and/or failure of the lamellar attachments, displayed by coffin bone displacement (rotation, sinking, or both).

Low-Grade Founder

Low-grade founder is an insidious type of founder that develops slowly over the course of months or even years, usually as a result of metabolic imbalance or neglected hooves. A low-grade case of founder is sometimes misdiagnosed as just a bad-footed horse. These horses may have never had an acute episode of laminitis to draw the attention of caretakers. They may never even seem lame. Instead, they may simply seem "ouchy" for a few days in the spring or appear to have a preference for softer footing. Often the problem isn't even suspected until radiographs are taken.

The exterior of the hoof with low-grade founder is likely to appear normal, but a close look at the bottom of the foot and radiography reveal minor but important changes. Usually the white line is stretched at the toe, making the horse more prone to white line disease. When you radiograph these feet there may be a degree or two of coffin bone rotation.

Fortunately, hooves with chronic low-grade founder are fairly easy to manage by just improving the condition of the sole, which in turn supports the coffin bone. If the horse has thin soles that are easily bruised you may just need to thicken up the sole depth. Sometimes just shoeing with a regular keg shoe, a wedge and a rolled toe is all that's required to help the sole become stronger and thicker. Glue is preferred rather than nails to apply the shoes for the first two or three shoeings. Once the sole is thickened, the horse can go barefoot with the edge of the hoof walls rolled.

Where the sole meets the wall it is fairly tough and strong, compared to the inner central part of the sole. The perimeter becomes calloused and strong. With this process of letting the sole thicken by first protecting it with shoeing, the feet grow out beautifully. The cracks in the wall grow out and the foot becomes shiny and healthy rather than dull and shelly; the integrity of the wall changes.

Some experts suggest using sole and frog supports in low-grade cases of founder until the sole naturally thickens. Chronic laminitis horses that have adequate sole depth do very well, but if they lose their sole depth they become uncomfortable and tender very quickly. You can create artificial sole depth, using things like packing or silicone pads.

Cases described as "stable founder" typically have mild rotation or movement of the coffin bone due to persistent low-level inflammation of the tissues. Like low-grade founder, the condition doesn't arise from a single carbohydrate overload after a raid on the feed room, but instead from an underlying physiological problem that continually stresses the structures of the hoof. Nor are these horses likely to have an episode of acute pain, but they are more likely than horses with low-grade founder to be continually tenderfooted and "off." Stable founder is also more likely to produce exterior evidence of the damage being done inside the hooves. There is more hoof capsule distortion in stable founder than in low-grade cases. The heels grow faster than the toe, and there are founder rings around the hoof. There's more dishing at the front of the foot, and stretching of the white line.

Radiographs will reveal rotation of the coffin bone, caused by the pull of the deep flexor tendon. The rotation isn't typically progressing, hence the term "stable," but is still the primary consideration in mapping out a shoeing protocol. One of the major shoeing goals is to decrease the pull of the deep digital flexor tendon and rehabilitate the feet. Therefore, the shoe requires some degree of wedge at the rear and also a rolled toe, to take some of the stress off the laminae during breakover.

Breakover is defined as the phase of the stride between the time the horse's heel lifts off the ground and the time the toe lifts off the ground. The toe acts as a fulcrum around which the heel rotates under the influence of the deep digital flexor tendon. The suspensory ligament to the navicular bone and the impar ligament are under maximal stress just before breakover. Changes in toe length, hoof/pastern axis and hoof angle all affect breakover and the tensile forces on the deep digital flexor tendon. In general, breakover is significantly delayed with the presence of a long toe and acute hoof angle because the long toe acts as a long lever arm, requiring more time and forces to rotate the heel around the toe.

In addition, it is believed that tension exerted by the deep digital flexor tendon against excessive toe length results in lamina tearing, which may lead to hoof distortion. The goal of trimming and shoeing the equine foot is to facilitate breakover, ensure solar protection and provide palmar/plantar heel support, no more so than with a horse exhibiting hoof disorders as referenced above. Facilitating breakover, i.e., moving breakover in a palmar/plantar direction, shortens the lever arm created by the toe, changes the tensile forces in the deep digital flexor tendon, moves the navicular bone slightly proximal and changes the angle between P2 and P3. Decreasing the toe length can facilitate breakover by applying a rolled toe shoe.

Although the weight of the horse, transferred through the limb skeleton to the distal phalanx, is considered to be the primary force causing progressive separation of compromised lamellae, additional separation appears to be caused by the rotary force exerted by contraction of the deep digital flexor muscle via the palmar insertion of its tendon (the deep flexor tendon) to the palmar distal phalanx. Therefore, raising the heels of feet affected by acute laminitis by means of a therapeutic shoe with a wedge comprising of 1-3 degrees is claimed to decrease the biomechanical tension in the deep flexor tendon 50-60%, arrest further dislocation of diseased lamellae and to reduce pain.

The club foot is recognized as having strong heel structures and plenty of heel mass; however this foot type can also be affected with chronic heel pain. Since the club foot overloads the toe and bone column, arthritis, sidebone, pedal osteitis of the apex of the P-3, navicular bone sclerosis, osteoarthritis, and contracted heels are common pathologies seen. The compressive forces on the navicular bone are increased as the DDFT (deep digital flexor tendon) is pulled taught against the flexor surface of the navicular bone. It has been shown that upright or club feet have thinner fibro cartilage layer compared to normal feet. Most likely a result of the increased compressive forces of the DDFT against the flexor surface of the navicular bone.

Club feet often have increased wall growth in the heels and slow wall growth at the toe. This is the foot's attempt to raise the heels and unload or accommodate the contracted deep digital flexor tendon. The foot remodels to accommodate all phases of the stride. Since the deep digital flexor tendon is under the most tension just before heel lift off (break over), it is this phase of the stride, which must be addressed when re-balancing the clubfoot. Significantly enhancing/easing break over can allow these feet to return to a normal appearance.

Most club feet can achieve equal toe/heel growth and resolve the anterior dish with these simple mechanics. It is important to realize that the goal is not to fix or resolve the contracture, but merely accommodating it with simple shoeing mechanics and allowing the foot to return to a more normal shape, with even wall growth, no dish, good anterior sole depth, and therefore be a stronger, healthier foot.

SUMMARY OF THE INVENTION

The horseshoes provided in accordance with the present invention overcome the shortcomings of known prior art horseshoes, and known methods for treating angular deformities.

The therapeutic extension horseshoe of this invention overcomes the shortcomings of known extensions, and known extension horseshoes, aiding to correct for angular deformities in foals, weanlings and yearlings. The therapeutic extension horseshoe is formed to operate to provide either lateral or a medial extension, depending on the orientation at shoeing. That is, the therapeutic extension horseshoe itself is flipped so that either side may be applied to the foot, depending on whether a varus or valgus deformity is instantly being treated. Both ungulate and hoof-contact surfaces double as sole or ground contact surfaces, again, depending on where the extension is needed, on the outside (lateral) of the foot or inside (medial).

The present inventive therapeutic extension horseshoe, when affixed, facilitates the natural spreading and circulation pumping action of the equine hoof when in motion, and interferes as little as possible with the natural mechanical functioning of the horse's foot. The inventive horseshoe, but for the therapeutic embodiment, should not exert on the muscles and tendons thereof any strain, pressure or other unnatural force to which the horse is unaccustomed. Angular deformities in foals create unnatural forces and strain to the afflicted limb/s which can be extreme depending on the severity of the abnormality, the therapeutic extension horseshoe supports the limb, and thus load, by providing a platform where the hoof should be. This curtails the progressive deviation of the limb and distortion to the hoof capsule which in turn aids in the correction.

In all of the embodiments, the inventive horseshoes satisfy the aforesaid needs with a horseshoe configured to allow the equine hoof mechanism to function without limitation when under load forces, thus flexing and widening, the equine foot is encouraged to be as nature intended permitting the hoof to grow and wear without restriction. While the therapeutic extension horseshoe does modify the load bearing surface, to effect a stature modification as intended, the inherent structure and functioning remain the same.

Intended to benefit most are horses under highly stressed conditions of competition on the racetrack, exhibition arena or polo field. But the scope of the present invention could be a great deal wider where horses require an alternative to the rigidity of metallic shoes, e.g., horses performing on stage in the entertainment world, stallions when covering a mare in the breeding shed, or young horses that require custom made configurations to manage angular deformities, etc.

The therapeutic extension horseshoe of the invention was developed to aid with angular deformities in foals through weanlings (6-12 months old) to yearlings (12-20 months old). Adjusting angular deformities is possible only because a young horse's skeletal system is still growing and developing until the young horse is between 12-20 months. Once the growth plates at the joints have closed (bone stops developing), correction is not possible. For that matter, the growth plate at the fetlock closes at 12-16 weeks of age and that at the knee closes at between 16 to 20 months.

Angular abnormalities are usually present at birth and are a result of an imbalance in the growth plate(s). For example, one side may develop faster than the other resulting in a typical toed-in or toed-out stance. Correct limb alignment can be manipulated by applying the therapeutic extension horseshoe to the hoof with the extension below the overdeveloped growth plate.

One of the significant advantages of the therapeutic extension horseshoe is that its flexible resilient nature does not restrict but actually facilitates growth of the young horse's hoof. As mentioned, a foal's foot changes rapidly over the first few weeks/months and can easily be compromised by restricting this changes/growth with conventional horseshoe extensions (aluminum), full cuffs, etc. For that matter, in conventional treatments for angular limb deformities the foot may be sacrificed to correct the limb deformity. These problems are more prevalent if known types (e.g., aluminum) of horseshoe extensions are not changed on a regular basis.

Another advantage of the therapeutic extension horseshoe is that it provides support for the limb where the foot should be. The resulting added pressure to the growth plate slows its development and allows the opposing side to "catch up". For example, with the toed-out stance the extension horseshoe is applied with the extension/platform to the medial or inside of the hoof, the added pressure/load slows the growth of the medial side of the growth plate above, the lateral side of the growth plate continues to develop normally and as a result the limb is encouraged to straighten.

In a toed-in stance, the extension horseshoe is applied with the extension/platform to the lateral or outside of the hoof, the added pressure/load slows the growth of the lateral side of the growth plate above, the medial or inner side of the growth plate continues to develop normally and as a result the limb is encouraged to straighten. As mentioned, it is a matter of flipping the therapeutic horseshoe for either application.

Another advantage of the therapeutic extension horseshoe is that it adapts to the young horse's changing foot so it may be left on for longer periods of time. This of course realizes a cost saving with respect to DVM and/or farrier services.

Perhaps more importantly, anytime these therapeutic applications are applied and removed on a regular basis there is some portion of hoof wall removed. And under some circumstances, more hoof wall may be removed than is being generated (horn growth). The therapeutic extension horseshoe provides support across the entire hoof minimizing the distortion to the hoof capsule, for example, possible flare and wall separation.

In another embodiment, the invention provides a therapeutic support horseshoe. The therapeutic support horseshoe is designed to be used in therapeutic shoeing for hoof disorders that afflict the equine relieving pain and stress most commonly associated with the conditions such as club feet syndrome, laminitis and navicular region pain.

Shoeing a horse with the therapeutic support horseshoes can be short term whilst rehabilitating a horse that is exhibiting these disorders or, long term where conformation faults are managed keeping a horse comfortable and able to continue in its work.

The therapeutic support horseshoes are formed of polymer material surrounding a single (encapsulated) reinforcer (wire), extending between caudal ends that extend separately from an anterior segment to form an open heel. Polymer material has a degree of hardness similar to the natural hoof composition. The flexible nature of the polymer material works well to enhance the use of springs. The anterior segment is formed with a rolled toe, the caudal ends are formed as a wedge and a slot is cut into an inner surface of the horseshoe extending between the caudal ends between the hoof-contacting and ground contacting surfaces.

In one embodiment, the rolled toe is positioned indirectly beneath the anterior coronary band. The breakover in this region reduces strain on the dorsal hoof wall, decreases the effective moment arm of the toe in relation to the coffin joint. Use of the therapeutic support horseshoe supports healing and corrections in horses with: club feet syndrome, navicular region pain, and laminitis.

In another embodiment, the slot cut into the inner surface operates to maintain a sole support system in place during all types of conditions. Sole support systems might, for example, include a pour in pad or impression material and in an effort to reduce the concussion the horse with the pour in pad or impression material is subjected to.

The intended goal of therapeutic shoeing is to relieve the stress on the hoof capsule facilitated by the mechanics of the therapeutic support horseshoe, i.e. rolled toe, wedge and slot. Along with therapeutic shoeing of horses with the aforementioned hoof disorders, use of a pour in pad is almost always recommended by veterinarians and farriers.

"Pour in" pads come in a two part liquid that is dispensed into the sole of a horse's hoof using a dispensing gun and mixing tip. Once the two liquids mix together the material cures in approx. 2 minutes. The consistency or firmness may be controlled to be varied depending on the product and needs of the individual horse. In the liquid form, prior to curing, the material fills the concave region of the sole and also fills the slot of the therapeutic support horseshoe. The slot causes a flange/rim/collar to be formed around the perimeter of the sole support packing material, which flange/rim/collar operates to secure the pour in pad so formed in place. Please note, however, that the sole support pour in pad may be alternatively formed with a two part, silicone-based putty (impression material) that works in the same manner to create a flange from the impression material.

Impression Material is known to be used to successfully treat for laminitis, founder, navicular syndrome, contracted heels, under run heels, heel pain, ring bone, and many other pathologies that require sole/frog support and load sharing; it is simply one of the best tools farriers and veterinarians have today for enhancing caudal foot function, absorbing concussive forces, dissipating energy, and distributing support more evenly over a broader area.

Wedges are formed in each side segment of the therapeutic support horseshoe. The polymer material depth between the hoof contact surface and ground contact surface increases with an angle ranging between 1-3 degrees preferably 2 degrees commencing at the end of the rolled toe and ending at the caudal ends. The slot extends from one end of the inside heel (that is, a caudal end of one of the shoe's side segments extending back from the toe (anterior) around a complete web ending at the opposing caudal end (heel)). The slot operates to aid in securing pour in pads to the horseshoe and to the hoof in order to treat laminitic cases or other hoof disorders where sole support is required. Sole support systems' material can also be medicated to treat bacterial diseases at the same time as supporting the sole.

The use of the pour-in pads or impression material enhances reduction in concussion already achieved from polymer material, as the slot lessens the density of the polymer material of the horseshoe around the entire inner perimeter of the therapeutic support horseshoe. For that matter, the slot, due to less polymer material in this area of the entire inner web, makes it easier to custom shape the shoe for individual horses' feet.

The shoe can be modified by the professional in the field before or after application, by rasping to help with medial & lateral balance that cannot be achieved with the trim alone.

The reinforcer, preferably a wire, is embedded in polymer material. The wire is preferably thicker, for example, $3/16"$ for larger sizes rather than thinner, for example, $1/8"$ in smaller sizes of therapeutic support horseshoes. The size of the wire, however, is not limited to $1/8"$ or $3/16"$ but may be any diameter in range of between "$1/32$ and $3/8$". As with Reinforced Polymer and Extension Therapeutic horseshoes, the therapeutic support horseshoe is glue on only. This is particularly significant with uses to treat laminitic horses. Horseshoes that are nailed on to horses with this ailment can cause the horse to experience tremendous pain from driving of the nails into damaged laminae. Pain is derived from the elevated frequency and vibration created by the hammer driving the nail.

In an embodiment, the invention includes a horseshoe with inserts, preferably in a form of threaded receivers embedded in heels. The inserts are configured to accept metal protruding studs or caulks. The therapeutic support horseshoe is made with smooth surfaces and a rolled toe which helps eliminate traction on contact to ground surface interface. This reduces stress on ligaments and tendons, in combination with a sole support device, which cradles the bony column, this is enhanced even further. This combination creates a smooth unrestricted complete ground contacting surface.

One drawback or problem is the shoe can be slippery under certain ground conditions, by adding removable heel studs or caulks when needed, this can be remedied. The temporary heel studs or caulks are attached to the shoe by means of threaded inserts which are embedded in the polymer material at the caudal ends of each heel region. The studs or caulks have a shaft which also has threads which align with the threads in the embedded insert and are screwed in to secure attachment. Once attached the studs or caulks at the end of the threaded shaft protrude beyond the ground contact surface of the shoe and penetrate the ground thus offering traction/grip which in turn minimizes the sliding phase of the shoe which occurs without the studs in place.

The inserts (receiver) float in the polymer material approx. 1 inch from heel (caudal) end, but may be positioned anywhere at time of manufacture without deviating from the scope and spirit of the invention. The positioning of the inserts is restricted only in embodiments wherein the inserts are attached to reinforcer (wire).

The studs or caulks have varying size and shape configurations which determine the depth of ground penetration and grip, the shafts are configured as a constant standard to match the embedded threaded inserts Removable plugs are added to the insert (receiver) holes when studs are not in use to keep dirt etc. out.

Severely compromised or distorted feet usually require some form of axial support to redistribute weight off of compromised areas of wall. Axial support refers to recruiting structures within the margins of the wall for support. Shoe modifications along with sole support materials are various options. A good evaluation of the foot, horse footing, environment and discipline is required to properly utilize each of these.

Sole support stimulates sole growth from ground force reaction; significant mechanical support of an unstable distal phalanx can be achieved by the application of a frog/sole support device. From experience with many cases, farriers and veterinarians around the world indicate that the severity of founder is lessened if some form of frog/sole support device is applied.

In an embodiment, the invention provides a therapeutic support horseshoe which includes a resilient, flexile moldable material formed in a U shape with an anterior segment from which opposing first and second side segments continuously extend to opposing caudal ends separated as an open heel and a pliable, metal rod-like reinforcer embedded in the flexile moldable material between opposing hoof-contacting and ground-contacting surfaces, the reinforcer extending from one caudal end, through the anterior segment, to the other caudal end of the horseshoe. The horseshoe so formed includes an inner side surface and an outer side surface between the opposing hoof-contacting and ground-contacting surfaces a slot formed in the inner side surface, approximately halfway between the opposing hoof-contacting and ground-contacting surfaces, and extending from the one caudal end to the other caudal end.

The slot is cut into the side surface and while not limited to a rectangular or square cut, is preferably substantially rectangular. In an embodiment, the slot is approximately 4 mm deep and 4 mm wide.

The therapeutic support horseshoe further includes a rolled toe, wherein a height of the inner side surface is greater than a height of the outer side surface. The ground-contacting surface slopes up towards the outer side surface at the anterior segment thereby forming the rolled toe. In addition, a height or depth dimension of the therapeutic support horseshoe increases linearly between the outer side surface at the anterior segment and the caudal ends, to form a wedge-shaped therapeutic support horseshoe.

The therapeutic support horseshoe further comprising a sole support device provided between the caudal ends, at least part of which sole support device is received in the slot. The sole support device may comprise a pour-in pad. The pour-in pad comprises a two-part liquid that is mixed and dispensed proximate a sole of a horse's hoof using a dispensing gun and mixing tip.

The sole support device comprises an impression material, the impression material comprising silicone-based putty. The sole support device includes any of the group consisting of a flange, a rim and a collar.

In another embodiment, the therapeutic support horseshoe comprises a spring. The unrestricted nature/flexibility of the shoe works well with spring devices that are added across the heels of the shoe to aid in the rehabilitation of a horse with contracted heels, which can result from a lame horse not loading the sore foot with its full weight which is required to stimulate blood flow generated from frequent loading and unloading. A spring device is formed in a "V" shape and usually made of resilient spring steel, when it is applied to the heel region of the shoe it creates outward pressure to lessen contraction.

A spring device applied along with a sole support device further aids in the reduction of peripheral loading by distributing weight across the whole sole which also stimulates growth. The spring device has sharp points at the ends of the "V" angled horizontally which embed into the polymer material for attachment, further securement is achieved from a sole support device applied after the spring is put in place encapsulating it completely.

In an alternative embodiment, the invention includes a therapeutic extension horseshoe formed in a substantially u-shape from a resilient, flexile moldable material that comprises a pliable, metal rod-like reinforcer shaped to include an anterior segment from which opposing side segments continuously extend to caudal ends separated as an open heel, said reinforcer embedded in the material between ungulate and contact surfaces, wherein an extension is formed in one of said opposing side segments to extend and form an additional load bearing surface of said side segment in order to facilitate a modification of a posture of a horse shod therewith. The at least one wear insert arranged in said extension between the ungulate and contact surfaces to minimize surface wear to the moldable material therein. The at least one wear insert is connected to the reinforcer.

Preferably, the resilient, flexile moldable material comprises one of urethane, polyurethane and hybrid polyurethane and the at least one wear insert is constructed in a shape of a right circular cylinder, where a bottom lateral pin surface is arranged to be substantially coplanar with the ungulate surface. For that matter, a distance between the ungulate and contact surface is about ⅜".

BRIEF DESCRIPTION OF THE DRAWING FIGURE

FIG. 1 is an exploded perspective view of the preferred embodiment of the horseshoe to be adhesively attached to a horse's hoof;

FIG. 2 is a top perspective view of the horseshoe of FIG. 1 with the polymeric material removed from one side to expose half the hard wear resistant insert and wire;

FIG. 3 is an underside plan view of the horseshoe;

FIG. 4 is a side elevation of the horseshoe;

FIG. 5 is a front elevation of the horseshoe taken at arrow 5 of FIG. 1, showing the polymeric material removed to expose the hard wear resistant insert;

FIG. 6 is a sectional side elevation taken at 6-6 of FIG. 4, showing the hard wear resistant insert with prong extensions and wire exposed;

FIG. 7 is a sectional end view elevation taken at 7-7 of FIG. 4, showing the surface contour and exposed wire of the horseshoe;

FIG. 8 is a sectional elevation of an alternate toe portion embodiment, with hard wear resistant insert completely encased within the polymeric material;

FIG. 9 is still another alternate toe portion embodiment in which the hard wear resistant insert protrudes from the polymeric material;

FIG. 20 is a perspective view of the therapeutic extension horseshoe of FIG. 16, highlighting its bending capability along the long axis;

FIG. 21 is a perspective view of the therapeutic extension horseshoe of FIG. 16, highlighting its rotational capability along the short axis; and FIG. 22 is a perspective view in partial cutaway of the therapeutic extension horseshoe mounted to a hoof, illustrating the spreading capability when a direct load is placed on the shoe;

FIG. 23 is a perspective view of the therapeutic extension horseshoe mounted to the underside of the hoof during a stride, illustrating the reduced dimension of the ankle and corresponding proximal therapeutic extension horseshoe.

FIG. 24 is a perspective view of a pair of legs with a toe in problem, highlighting the installed therapeutic extension horseshoes and bone structure in phantom;

FIG. 25 is a perspective view of a pair of legs with a toe out problem, highlighting the installed therapeutic extension horseshoes and bone structure in phantom;

Figure 28A:
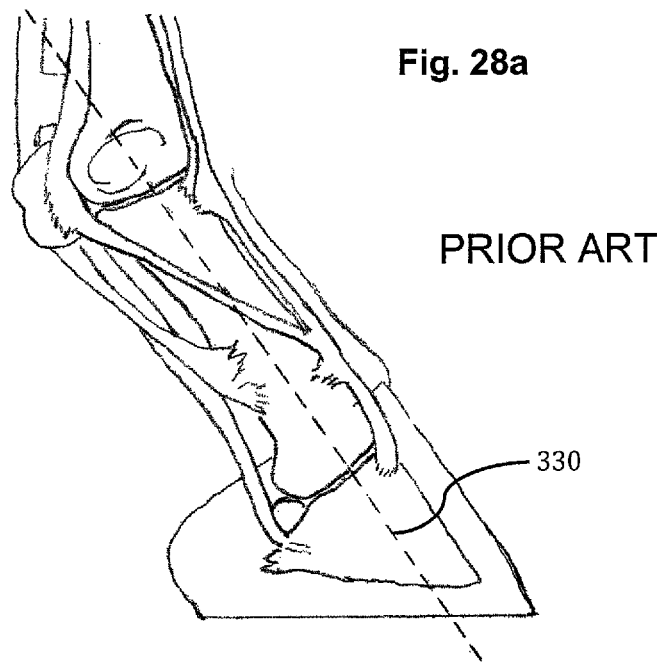
Figure 28B:
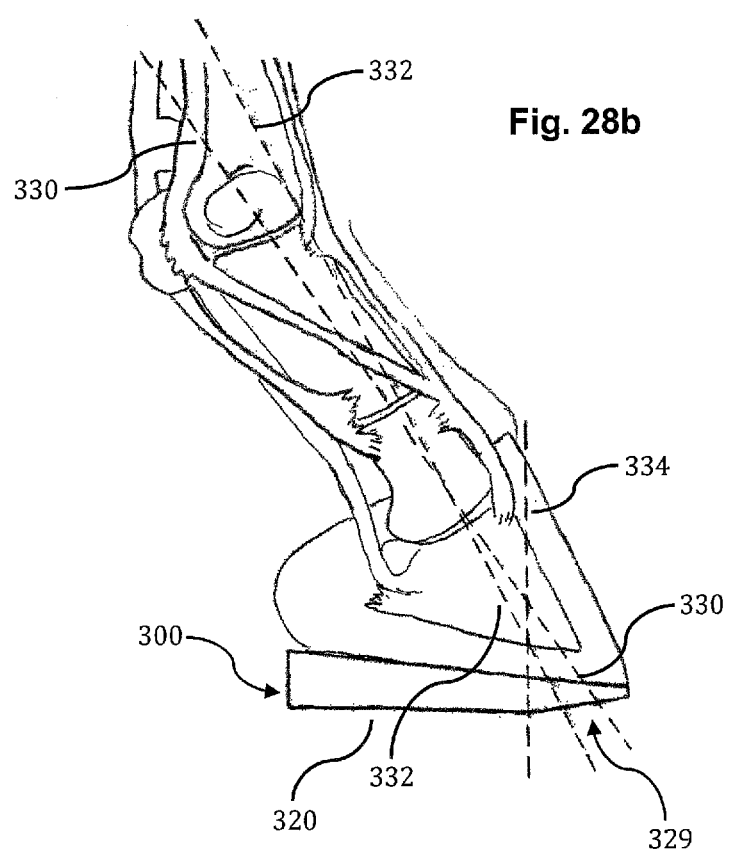

FIG. 26 presents a top plan view of a therapeutic support horseshoe of the invention;

FIG. 27a is a perspective view of the therapeutic support horseshoe with approximately one-half cut away but for the reinforcer that highlights the slot on the inner surface and the wedge-like shape;

FIG. 27b is a side cross-sectional view of an anterior section of the therapeutic support horseshoe of FIG. 27a;

FIG. 27c is left-side view of the therapeutic support horseshoe of FIG. 27a highlighting the wedge-like shape and rolled toe;

FIG. 28a is a prior art depiction of a lower leg of a horse fitted without a therapeutic support horseshoe in order to highlight bone alignment;

FIG. 28b is a depiction of a lower leg of a horse fitted with the therapeutic support horseshoe with a wedge shape and rolled toe in order to highlight bone alignment in response thereto;

FIG. 30 is an upper side perspective view of the therapeutic support horseshoe highlighting the wedge shape and slot on the inner inside surface;

FIG. 31a highlights a therapeutic support horseshoe on a horse's hoof, viewed from the underside that includes a sole support device;

FIG. 31b highlights a therapeutic support horseshoe on a horse's hoof, viewed from the rear that includes a sole support device;

FIG. 31c highlights a therapeutic support horseshoe on a horse's hoof viewed from the underside that includes a sole support device comprising a spring;

FIG. 32a highlights an alternative embodiment of the therapeutic support horseshoe that includes inserts and studs on the ground-contacting surface;

FIG. 32b is a side perspective view of the therapeutic support horseshoe of the FIG. 32a embodiment without the studs inserted in the inserts; and FIG. 32c is a side perspective of the therapeutic support horseshoe of FIG. 32a.

DETAILED DESCRIPTION OF THE INVENTION

The present invention teaches a novel design for a preferred horseshoe that closely resembles the natural composition of the equine hoof which conforms to the foot, imitating the known configuration which healthy, active, unshod horses acquire when living in a natural environment, and a novel therapeutic extension horseshoe designed to aid angular deformities in foals through yearlings.

FIG. 1 shows a shoe, or horseshoe 10 in accordance with one embodiment of the present invention, in spaced relation to the underside of a horse's hoof. The horseshoe 10 is molded in a traditional C-shape with an open heel. For orientation purposes, the shoe provides a toe portion 12, or anterior segment, left side portion 14, right side portion 14' and heel portions 16, or caudal segments. In practice, it is preferred that portion 14 and 14' be molded or formed as mirror images in terms of shape and surface contour. On an animal to be shod, the toe portion 12 is the segment of the shoe toward the anterior, or front, and the heel portions 16 are the segments of the shoe toward the caudal, or rear, of the animal. Although described here as segments, these are integrally formed as one piece, and the terms are used to describe their general location in relation to the hoof of a horse.

Referring again to FIG. 1, horseshoe 10 has a top 18, or hoof contact surface, which receives a coating of adhesive 40 prior to placement on the sole of the hoof. In practice, it is desirable that hoof contact surface 18 be roughened or otherwise textured, so as to insure a good bond with the adhesive 40 and the sole of the hoof. A typical hoof contact surface 18 is level, and tapers at the end of the heel portions 16.

Turning now to FIG. 3, the underside of shoe 10 is illustrated. A base 20 and 20', or ungulate surface, which is the terrain-contacting surface, is formed about the arcuate periphery of side portions 14 and 14' through the toe portion 12 ending at the heel portions 16. As seen in FIG. 3 and FIG.

4, the base 20 and 20' terminates in smoothly tapered faces 21 and 21', at heel portions 16. In practice, the base 20 and 20' is formed level so as to insure good contact with any typically encountered terrain. As seen in FIGS. 3 and 4, shoe 10 is formed with an inwardly tapering, arcuately formed outer edge 24, and inner edge 26. As best seen in FIG. 7, which is a sectional elevation taken through left side portion 14, a bevelled 22, or chamfered surface, forms a transition between the outer edge 24 of the base 20 and inner edge 26. This bevelled 22 form can be optionally formed as a flat surface, or with a slight "belly" as seen in FIG. 7.

During the lifespan of the shoe 10, the width of the base 20 will increase as a result of frictional terrain contact, as bevelled surface 22 is ground down (shown in FIG. 13 and discussed later). This "wearing" of the shoe is desirable, as the material forming the shoe absorbs the impact and does not transfer the stress to the horse's musculature.

Turning now to FIG. 2 a portion of the internal structure of the horseshoe 10 according to one preferred embodiment of the present invention is revealed. In a typical embodiment, the shoe is molded of a polymeric material 36, and preferably hybrid polyurethane. A pliant wire 28, or reinforcer which may be made from metal such as, steel, aluminum alloys, stainless steel and the like, which can be formed and retain a C shape, or arc, is embedded within the horseshoe 10, or it can be totally encapsulated. The wire 28 is preferably formed of a single rod of material, which is then encased within the polymeric material 36 of the shoe, as seen in FIG. 2. The encapsulated wire 28 preferably has a thickness of approximately ⅛", but the size is predetermined by one skilled in the art of a farrier. To reinforce the toe portion 12 of the shoe, which contacts the ground surface, the invention includes a hard wear resistant insert 30, or hardened reinforcer, preferably made from metal such as steel or another hardened material.

When a metal is used for the reinforcers, one preferred embodiment is a magnetizable metal, which is considered therapeutic by those skilled in equine science.

As shown in FIG. 5, the toe portion 12, the hard wear resistant insert 30 when made of steel is attached to the wire 28 by at least two prong extensions 34. Typically, spot welding, as at 32, is employed to join the hard wear resistant insert 30, prong extensions 34 and wire 28, although other fabrication processes could be contemplated. The hard wear resistant insert 30 preferably is approximately 2½" in length, ¼" in width, with prong extensions 34 of approximately ¼" and the insert preferably is almost completely encapsulated within the moldable polymeric material 36, as seen in FIGS. 5 and 6. It should be noted that polymeric material 36 forms a thin wall around hard wear resistant insert 30; this wall wears away quickly subsequent to installation on the hoof, exposing the hard wear resistant insert 30.

In other embodiments, the hard wear insert is fitted to the anterior segment of the shoe by means other than welding, such as being co-molded with the entire shoe, bonded chemically or by polymeric bonds, joined with mechanical fasteners.

Two alternate embodiments are shown for toe portion 12 in FIGS. 8 and 9. FIG. 8 discloses a profile in which hard wear resistant insert 30 does not depend from the underside of the shoe. FIG. 9 illustrates a hard wear resistant insert 30 which depends from the shoe and is not completely encased within the polymeric material 36.

The moldable shoe generally is molded integrally, in one piece, and is an open ellipse shape. That ellipse is closed from the caudal end portions, through the side segments and the anterior segment, and is open between the two caudal ends. The shoe is flexile, because of the moldable composition and the pliant metal reinforcer, such that the shoe can be conformed to the shape of a horse's hoof. The pliant metal embedded or encapsulated in the shoe enables the farrier to bend it to conform to the circumferential edge of the hoof. That pliant metal reinforcer preferably is joined to the second reinforcer, or hard wear insert, which is fitted to the anterior segment or toe portion of the shoe.

The shoe has a contact surface that is joined to the hoof by adhesives, selected by skilled farriers. The opposite side of the shoe is the ungulate surface, which has the inventive quality of performing like an unshod hoof. The ungulate surface preferably has a sidewall, a crowned edge and an inner wall. The sidewall starts along the outer arc of the ellipse-shaped segments. The sidewall of many conventional metal horseshoes is vertical from the hoof to the ground. The preferable sidewall of the present invention is not vertical, but is chamfered or bevelled in toward the inner arc of the ellipse-shaped segments. The chamfered sidewall, crowned edge and tapering inner wall of one preferred embodiment perform, wear and flex in a way comparable to an unshod hoof.

The horseshoe 10 is molded from polymeric material 36 to form a moldable shoe that is flexile. Polymeric material 36 is available in a vast range of durometer hardness, and flexural qualities. The present invention's durometer on the Shore D scale preferably ranges from 60 to 70 from the Hapflex 600 series device, produced by Hapco Inc. Hanover, Mass. Physical properties:

|  | 661 | 666 | 671 |
|---|---|---|---|
| Hardness Shore | 60D | 65D | 70D |
| Tensile Strength (psi) | 2400 | 3300 | 4200 |
| Tear Strength (pli) | 420 | 450 | 660 |
| Modulus of Elasticity (psi) 000 | 20 | 25 | 60 |
| Heat Distortion |  |  |  |
| Temp. (° C.) 66 psi | 122° C. | 110° C. | 133° C. |
| 264 psi | 62° C. | 71° C. | 124° C. |
| Flexural Strength (psi) | 1660 | 2700 | 3710 |
| Flexural Modulus (psi) 000 | 24.6 | 41 | 57 |

Figure 10:
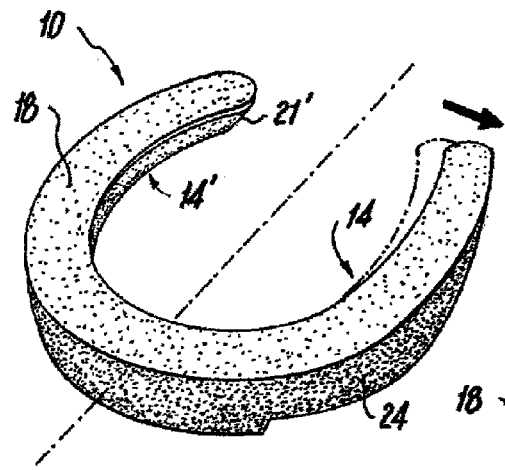
FIG. 10 is a perspective view of the horseshoe showing width-wise bending of the side and heel portion.
Figure 11:
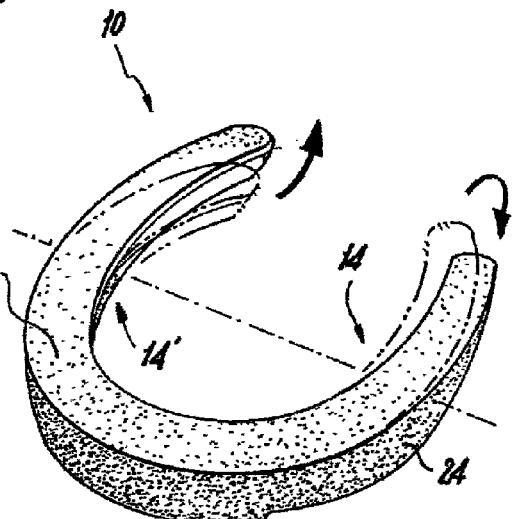
FIG. 11 is similar to FIG. 10, however illustrates the racking ability of the side and heel portions of the horseshoe.

As seen in FIGS. 10 and 11, the durometer of polymeric material 36 forming the preferred embodiment allows for flexing and bending of side portions 14 and 14'. This bending or "racking" of the shoe is advantageous for custom fitting of the shoe during installation on a hoof. In particular, racking is illustrated in FIG. 11, where the side portions are stressed in opposing directions about the longitudinal centerline. This flexibility and durability may be required while traversing a rugged trail, in which the horse's hoof is subjected to awkward hoof strikes on rocks, crevices and debris. The ability to flex increases the shoe's durability, as well as mitigating the stress applied to the horse's hoof, ankle and leg.

Figure 12:
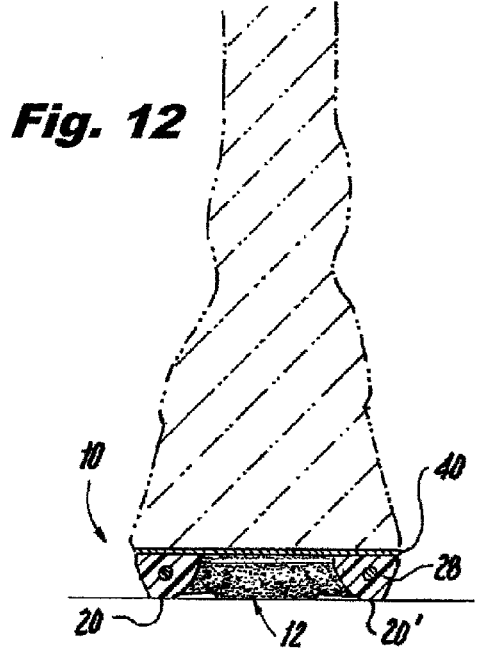
FIG. 12 is a diagrammatic sectional elevation of the preferred embodiment of the horseshoe adhered to a horse's hoof.
Figure 13:
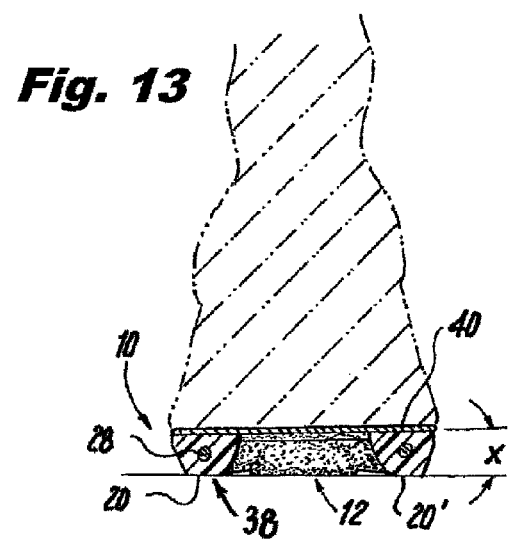
FIG. 13 is a diagrammatic sectional elevation of the preferred embodiment, showing uneven wear of the polymeric material as a result of a horse's uneven gait or angular deformities.

FIGS. 12 and 13 are diagrammatic sectional elevations of shoe 10, as viewed from the heel portions 16. FIG. 12 shows a new shoe 10 installed with an adhesive 40 layer to a horse's hoof. It is appreciated that the base 20 and 20' is intact, as is toe portion 12. FIG. 13 illustrates shoe 10 as worn by a horse suffering from an uneven gait or angular deformities. It will be appreciated that the base 20 has been worn down as at 38, the result of compensating for the horse's uneven load forces upon the hoof. The shoed portion of the hoof which takes the greatest measure of ground contact will wear down comparably to that of an unshod hoof.

In addition to the uneven load forces the equine hoof wall may have varying growth rates, the shoe 10 adapts to this uneven growth by wearing therefore the hoof is permitted to strike naturally, as indicated at an angle denoted by "x". The flexile material does not bind the hoof as does a metal shoe. Unlike prior art, which typically causes discomfort during an uneven hoof strike, shoe 10 allows for the uneven hoof strike and provides both comfort and shock absorption.

Figure 14:
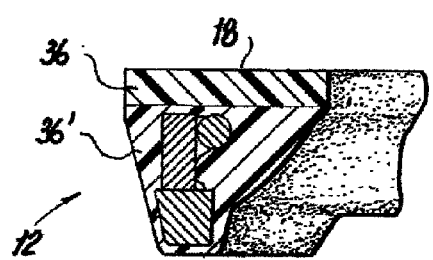
FIG. 14 is a sectional elevation of an alternate toe portion embodiment, illustrating dual layers of polymeric material with differing durometers.

The horseshoe 10 according to the present invention is molded from polymeric material 36 with a uniform durometer of hardness. Alternatively, as depicted in FIG. 14 alternate layering of polymeric material 36 with different durometer of hardness in the molding step could be beneficial for some animals or for varied ground conditions. As illustrated in FIG. 14, toe portion 12 is formed with a polymeric material 36 of a durometer for comfort adjacent the hoof, while material 36' is selected for durability and wear-resistance due to its harder durometer. Persons skilled in the art will rely on their experience to select a moldable composition that provides useful levels of flexibility, wear and resiliency, and to select a reinforcer wire that is sufficiently pliant that adequately holds the desired shape, and to select a hard wear insert material for the horse and the ground conditions. All of these are within the level of skill of an experienced farrier.

Process of Manufacture

The wire 28 is shaped and cut from bar stock to the C shape of the preferred horseshoe 10 which varies in sizes. The wire 28 length is adjusted to fit inside the mold allowing for approximately ½" where the side portions 14 and 14' preferably taper to faces 21 and 21' at the heel portions 16. The toe portion 12 of the wire 28 is attached by spot welds 32 to the prong extensions 34 of the hard wear resistant insert 30. Fabricating the wire 28 and hard wear resistant insert 30 in one piece is an alternative. Another embodiment is spot weld 32 to prong extensions 34 where the hard wear resistant insert 30 would be flush with the base 20 of the horseshoe 10, as shown in FIG. 8, or to spot weld 32 to prong extensions 34 resulting in the hard wear resistant insert 30 projecting out from the polymeric material 36, as shown in FIG. 9.

A mold of the preferred horseshoe 10 is sprayed with a suitable release agent, such as, Grease-It Four, Hapco Inc. The wire 28 with attached hard wear resistant insert 30 is set inside the mold with the ends of the wire 28 suspended by fine line made of plastic, nylon or like material across the heel portions 16, or by using magnets to hold the wire 28 in place or by other means to maintain the wire's 28 position in the core of the mold. An alternate embodiment, when using a magnet to maintain the wire's 28 position in the core of the mold, is to place and secure the magnet on top of the wire 28 allowing the polymeric material 36 to encapsulate it to become part of the horseshoe 10. This alternate embodiment would magnetize the horseshoe 10 providing magnetic therapy to the hoof wall when fitted.

The polymeric material 36 is mixed to a moldable form, in accordance with the chosen product's ratio formula, preferably to a low viscosity, making it easy to handle and pour. Gel time is approximately 30 minutes with a demold time of 2-4 hours, which is the time to reach 80% of cure. Size, mass and temperature effects gel and demold time. For a full cure, some may prefer to allow 7-10 days. Demold and final cure time can be accelerated with the addition of heat.

The mold defines the segments of the shoe, and the shape of the preferred ungulate surface, as described above. When the mold is filled, the composition reaches a level naturally, which forms the generally planar, hoof contact surface.

Once full cure is reached the preferred horseshoe 10 is prepared for attachment. To achieve a surface that bonds well with adhesive 40 the top 18, or hoof contact surface of the preferred horseshoe 10 is sanded to attain a rough appearance and feel as opposed to a smooth, glossy finish realized straight from the mold.

The process for manufacturing the therapeutic extension horseshoe (discussed in detail below in cooperation with FIGS. 15-25) is slightly modified. For example, instead of maintaining the reinforcer (i.e., first reinforcer or wire) close to the contact surface, the reinforcer is maintained in substantially the center with respect to the vertical depth, or halfway between the surfaces. In an embodiment including that the wear inserts (vertical studs) stand alone in the moldable polyurethane material comprising the lateral or medial extension, such that they are not connected to the wire-like, U-shaped reinforcer, they may be inserted into the mold material and set in place as cured.

Alternatively, the wear inserts/studs may be inserted into vias first drilled in the cured material comprising the lateral or medial extension portion. Where the wear inserts/studs are connected to the reinforcer, which is located within, or proximate, the extension within the therapeutic extension shoe, they are first welded to the reinforcer prior to its insertion in the mold, or material in the mold before it is set.

Method of Attachment

The design of the preferred horseshoe 10 is such that it is attached to the hoof by adhesive 40. In the preferred embodiment, the shoe has no nail holes or attachment tabs, and is designed to be adhered to the hoof by adhesive between the contact surface of the shoe and the hoof. Through field testing much success has been achieved by using Equilox, Vettec or Grand Circuit Hoof Adhesive, which are among several products on the market for bonding horseshoes to the hoof. The properties of these adhesives allow the preferred horseshoe 10 to flex and widen without weakening the bond between the horseshoe and hoof.

After the hoof is prepared (trimmed and rasped) and the preferred horseshoe 10 custom fitted, a degreasing agent such as acetone is applied to the perimeter of the sole where the adhesive 40 shall be applied. It is important to have a clean, greaseless surface to achieve a good bond. Alternatively, the contact surface may be roughened so as to accept adhesive and form a bond. A protective foot covering can be used to keep the hoof clean whilst the adhesive 40 is prepared. Hoof adhesive 40 is applied to the top 18, or hoof contact surface of the preferred horseshoe 10.

Alternatively, adhesive can be applied to the perimeter of the sole of the foot, with care being taken not to apply the product in excess. Any excess adhesive 40 can be removed and added to the heel area where required. In some cases where a horse's hoof is weakened from previous nail holes or past ailments this is an appropriate time to patch the area with hoof adhesive 40 during or after fitting the preferred horseshoe 10. The cure time of the hoof adhesive 40 gives a farrier time to set the preferred horseshoe 10 in place and adjust its position if necessary before setting. Cure times vary with environment conditions and products. They range between 2-4 minutes in warm temperatures up to 7 minutes in cold temperatures. Several products on the market have faster cure times than others.

Once the preferred horseshoe 10 is set in place and the hoof adhesive 40 has cured any excess adhesive 40 on the sole, outside of the hoof wall or around the heel area is removed by rasping or use of a sanding tool resulting in a streamline uninhibited foot. The hoof adhesive 40 once cured is comparable to the composition of the hoof wall.

When the horse is due to be shod again the preferred horseshoe 10 is simply trimmed off using farrier's nippers just as if it was hoof wall.

Operation of Invention

The simplicity of the present invention is one of the advantages over prior art. It is devised to be part of the horse's own hoof and function as one, expanding and contracting in the identical direction.

The hoof mechanism in its natural state is designed to be a shock absorber as well as a vital aid to the circulatory system. When a horse is in motion, on contact with the ground surface the weight of the horse compresses the digital cushion between the pastern bone and the sensitive frog and redirects the remainder of the force outwards and upwards to the lateral cartilages (attached to the sides of the coffin bone). The foot expands and widens when under load forces as does the polymeric material 36. As the foot is lifted in stride the digital cushion expands and the foot contracts, as does the polymeric material 36, forcing the blood out of the foot and up the leg.

The polymeric material 36 is designed to wear 38 unlike the deliberations of prior art horseshoes. This characteristic is enhanced by the base 20 of the preferred horseshoe 10. As the base 20 is bevelled 22 from the outside edge 24 of the preferred horseshoe 10 to the inside edge 26 it shall wear 38 more rapidly when subjected to additional force, this wear will slow as the bevelled 22 edge becomes worn and thus wider. For example when a horse's foot hits the ground it may not set it down evenly due to bad confirmation or gait. (Many horses do not have perfect confirmation or way of going.) If more weight is distributed on one heel over a period of time the base 20 of the preferred horseshoe 10 shall wear 38 down more in this area having the effect of self-levelling which in turn prevents the horse's heel becoming jammed up leading to pain and inflammation in the foot. This concave shape of the preferred horseshoe 10 imitates the known configuration which healthy, active, unshod horses acquire when living in a natural environment.

The wire 28 which is encapsulated within the preferred horseshoe 10 does not restrict its flexing and widening capabilities. The wire 28 has two novel and primary purposes. First, is to enable shaping of the horseshoe 10 by a farrier in the field for an individual horse, when the horseshoe 10 is custom formed by hand (pressure applied to widen or reduce the width) the wire 28 retains the shape without the need of special equipment making the procedure quick and efficient. The polymeric material 36 of the preferred horseshoe 10 can simply be cut, sanded or rasped if necessary. Second, is to give the hard wear resistant insert 30 a means of attachment and reinforcement within the polymeric material 36.

The hard wear resistant insert 30 which is attached to the wire 28 gives reinforcement to the toe portion 12 of the preferred horseshoe 10. As this area of the preferred horseshoe 10 is subjected to the most abrasion especially over unnatural surfaces, e.g., tarmac and concrete, the hard wear resistant insert 30 prevents the preferred horseshoe 10 in this area wearing too rapidly, thus extending the time between shoeing.

Therapeutic Extension Horseshoe

As described in detail above, angular deformities occur when the distal extremities of the limb deviate from the midline of the limb. Valgus deformity is a deviation lateral of the mid line. Varus deformity is a deviation medial of the mid line. Lateral and medial therapeutic extension horseshoes of this invention are primarily intended for use on foals or young stock with limb development problems, these shoes extend to the inside (medial) or the outside (lateral). By creating a ground-bearing surface in the position where the foot should be, the active growth plates can adapt to the foot's modified posture. The plates must be actively growing, as you cannot manipulate the deformity once the limb has stopped growing.

The benefit of flexing and moving with the foot is achieved with the therapeutic extension horseshoe, as explained in detail above. That is, the resilient moldable material (for example, urethane or hybrid polyurethane) and the reinforcer act in the same way as in the non-therapeutic horseshoes. As mature horses benefit from the inventive horseshoe described above, the properties are even more important in horseshoes worn by young growing horses when used in cooperation with natural growth cycles to correct for the aforementioned limb deformities.

As described above, using extensions made of acrylic material is known. A DVM or farrier applies and builds up material around the hoof wall to create a platform, instead of using an extension horseshoe. Such a method, however, can be detrimental to the integrity of the hoof wall resulting in a possible flare and wall separation. The therapeutic extension horseshoe provides support across the entire hoof, minimizing distortion to the hoof capsule.

In view of the fact that the therapeutic extension horseshoe is designed to treat young developing horses (foals, weanlings, yearlings), there is no need for a hardened wear insert to be present in the toe or anterior region as foals through yearlings typically are not subjected to the abrasive surfaces present at racetracks. While foals through yearlings are generally too young for this type of work/competition, they do benefit from the inclusion of studs or wear inserts arranged in the lateral or medial extensions.

That is, while foals/yearlings are not necessarily training on special surfaces likely to abnormally wear a horseshoe, the maximum benefit of a therapeutic extension horseshoe is realized where the extended portions of the polyurethane mold structure are not degraded by wear. That rounding or degradation from wear will detract from a maximal therapeutic effect. Hence, by including wear inserts or vertical studs in the extension, the full remedial potential may be realized.

For that matter, the studs may be arranged in the polyurethane mold structure to stand alone, or may be connected directly or indirectly to the reinforcer. The reinforcer may be traditionally U-shaped, or may deviate slightly so that a portion (from the toe to one caudal end) extends into the medial or lateral extension, as shown in the drawing figures. The wear inserts (vertical studs) may be incorporated into the lateral or medial extension portions during fabrication, i.e., molded, or may be inserted into openings or vias drilled or otherwise imposed in the molded material (e.g., polyurethane), forming the extension area after curing.

Figure 15:
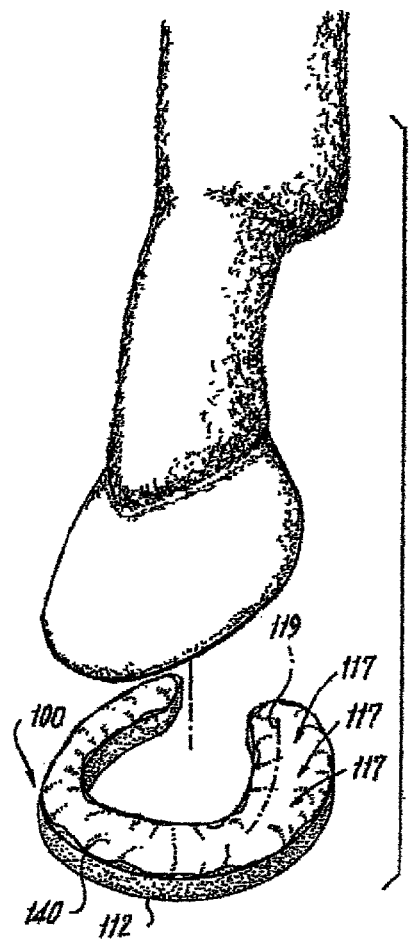
FIG. 15 is a perspective view of a therapeutic extension horseshoe of the invention, adjacent a hoof.
Figure 16:
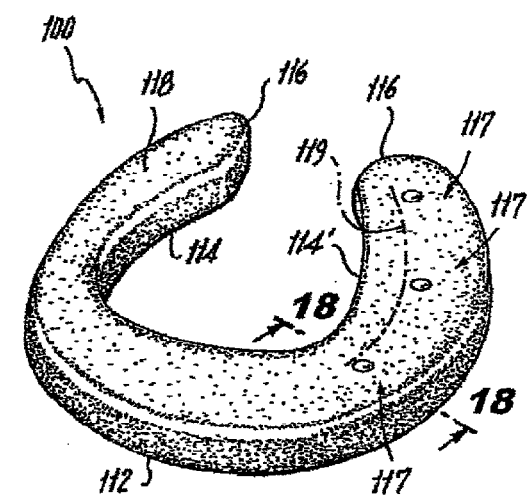
FIG. 16 is an enlarged perspective view of the therapeutic extension horseshoe of FIG. 15, including a reinforcing member with wear studs connected thereto.
Figure 17:
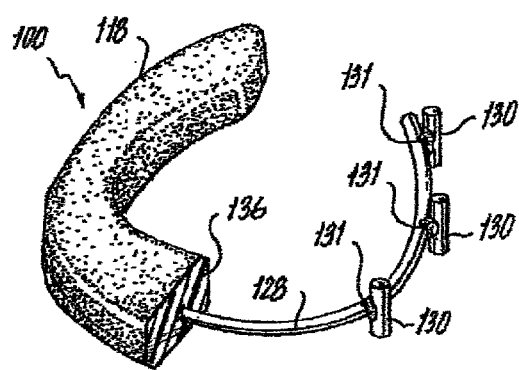
FIG. 17 is a view exposing the reinforcing member and wear studs.

FIG. 15 is a perspective view of a therapeutic extension horseshoe 100 of the invention, with a layer of adhesive 140, adjacent a hoof. FIG. 16 is an enlarged perspective view of the therapeutic extension horseshoe 100 of FIG. 15, where FIG. 17 is a view exposing a reinforcing member 128 and wear inserts or studs 130. The therapeutic extension horseshoe 100 is molded in a traditional U-shape with an open heel.

For orientation purposes, the shoe provides a toe portion 112, or anterior segment 112, left side portion 114, right side portion 114' and heel portions 116, or caudal end segments. Although described here as caudal segments, these are integrally formed with the right and left side portions 114, 114' and anterior segment 112 as one piece, and the terms are used to describe their general location in relation to the hoof of a horse. The therapeutic extension horseshoe 100 has a top 118, or hoof contact surface, which receives a coating of adhesive prior to placement on the sole of the hoof. A typical hoof contact surface 118 is level, and tapers at the end of the heel portions (i.e., caudal end segments) 116.

Therapeutic extension horseshoe 100 is molded of a polymeric material 136, and preferably hybrid polyurethane. A pliant wire 128 or reinforcer is embedded in the hybrid polyurethane according to the method of manufacture. The reinforcer 128 may be made from metal such as, steel, aluminum alloys, stainless steel and the like, which can be formed and retain the U shape when flexed with normal hoof contractions and expansions (between the open heel caudal end segments). The reinforcer 128 is preferably formed of a single rod of material, which is then encased within the polymeric material 136 of the shoe. The encapsulated wire or reinforcer 128 preferably has a thickness of approximately ⅛", but the size is predetermined by one skilled in the art of a farrier.

As can be seen clearly in FIGS. 15 and 16, therapeutic extension horseshoe 100 includes an extension portion 117, to the right of a virtual line 119 in the plane of the figures. This is the portion to the right of virtual line 119 comprising hybrid polyurethane shaped as to enlarge the size of the platform for one side of the horse's hoof. Please note that assuming the FIG. 15 hoof to be a left front hoof of a yearling facing out of the page, the extension portion 117 (in the orientation shown) may be said to operate as a "lateral" extension (as shown in FIG. 24). The lateral extension extends out from right side portion 114'. Please note, however, that it is an advantage of the invention that the therapeutic extension horseshoe, if affixed to a right hoof (as shown in FIG. 25) may be said to operate as a "medial" extension.

Put another way, merely flipping the shoe will change its operation as a medial or lateral therapeutic extension horseshoe.

Figure 18:
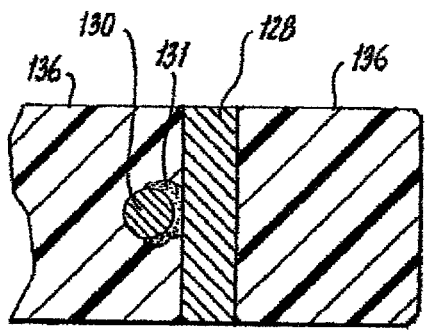
FIG. 18 is a sectional elevational view taken at 18-18 of FIG. 16, highlighting the reinforcing member with wear studs encapsulated in urethane.

To reinforce the extension in right side portion 114', which contacts the ground surface, the therapeutic extension horseshoe 100 includes one or more wear resistant inserts or studs 130. Three wear inserts or studs 130 are shown in FIG. 17 connected directly to reinforcer 128, preferably welded. FIG. 18 is a sectional elevational view taken at 18-18 of FIG. 16, highlighting the reinforcer 128, as welded by weld 131 to wear insert 130, encapsulated in urethane 136. For that matter, wear inserts or studs 130 are preferably hard wear inserts, and are not pliable.

Please note that while three wear inserts or vertical studs are shown in the drawing figures, any number may be used depending on the intended application. For example, in the foal stage, the weight of the foal is less than that of the yearling and depending on the severity of deformity, the foal's exercise will be controlled (stimulation to growth plates). Hence, therapeutic extension horseshoes constructed for use by foals may not require a stud (vertical insert) for wear resistance or if at all, only one in the area of load bearing extension.

Weanlings are heavier than foals, so hooves and horseshoes shod thereon are subjected to greater load. In this case, more than one stud (vertical insert) may be required to maintain proper form depending on the time that the therapeutic extension horseshoe is attached. Yearlings are heavier than weanlings (and foals). And as mentioned, the more severe the limb deformity the greater the load bearing on the extension and possible wear. Hence, at least two studs (vertical inserts) are required for therapeutic extension horseshoes utilized to treat yearlings.

If one or more studs were not present in the extension, the polyurethane would more readily wear under the additional load having an adverse effect on the limb, at least because the area of wear would likely be lower in profile than the other side of the shoe.

Figure 19:
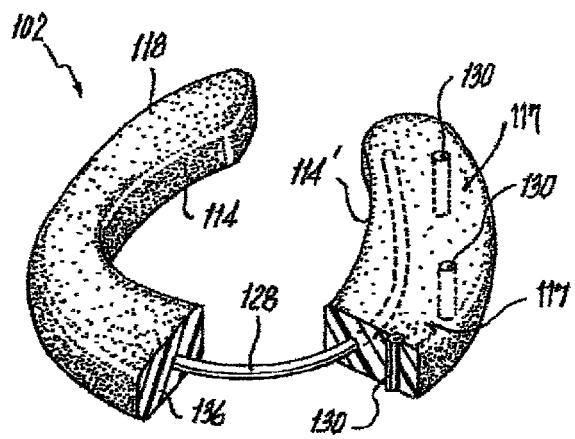
FIG. 19 is a perspective partial cutaway view of an alternative embodiment of the therapeutic extension horseshoe of FIG. 15, wherein wear studs are arranged but are not affixed to the inner reinforcing member.

FIG. 19 is a perspective view of an alternative embodiment of the therapeutic extension horseshoe embodiment depicted in FIGS. 15-18. Therapeutic extension horseshoe 102 of FIG. 19 includes that wear inserts or vertical studs 130 are arranged to stand alone in polyurethane 136. They are not affixed to the reinforcer.

FIG. 20 is a perspective view of the therapeutic extension horseshoe 100, 102, highlighting its bending capability with respect to a virtual axis 101. That is, virtual axis 101 bisects the therapeutic extension horseshoe into one half extending from anterior segment 112 through left side portion 114 to caudal end 116 on the left of the figure, and through right side portion 114' to caudal end 116 on the right of the figure.

The left ghost portions 115 and right ghost portions 115' (on both sides of each caudal end 116) represent a location into which a portion of the respective side/ends extend/retract with the lateral flexing (i.e., expanding and contracting) with natural hoof movements.

FIG. 21 is a perspective view of the therapeutic extension horseshoe 100, 102, highlighting its rotational capability along the short virtual axis 103. That is, each side portions 114, 114', including an extension, is able to flex vertically with respect to the lateral plane independently of the other, as does the natural hoof.

FIG. 22 is a perspective view in partial cutaway of the therapeutic extension horseshoe 100, 102 mounted to a hoof in order to illustrate the spreading capability when a direct load is placed on the shoe, and the blood flow to and from the hoof. As mentioned above, blood flow is enhanced by the natural flexing, vertically and laterally with respect to the left and right side portions of the hoof, and these natural movements are not limited in any way by attachment of the therapeutic extension horseshoe 100, 102. A build-up of adhesive 140 is shown to extend up from contact surface 118 to surround at least part of the hoof, which may be applied to the extension horseshoe by the DVM or farrier. This prevents the mare or foal from stepping on the extension part of the therapeutic extension horseshoe, which extends out from the hoof wall, and inadvertently dislodging it.

FIG. 23 is a perspective view of the therapeutic extension horseshoe 100, 102, affixed to the underside of the hoof during a stride. The FIG. 23 perspective illustrates the reduced dimension of the ankle and corresponding proximal therapeutic extension horseshoe.

FIG. 24 is a perspective view of a pair of legs with a toe-in problem, highlighting the installed therapeutic extension horseshoes 100, 102 and bone structure in phantom. The therapeutic extension horseshoes 100, 102, as shown, are operating to provide lateral extensions.

FIG. 25 is a perspective view of a pair of legs with a toe out problem, highlighting the installed therapeutic extension horseshoes 100, 102 and bone structure in phantom. The therapeutic extension horseshoes 100, 102, as shown, are operating to provide medial extensions.

Preferably the therapeutic extension horseshoe is formed of a certain thickness, i.e., of the moldable material. The thickness is normally defined in a range of between ⅛" to ¾" but is preferably about ⅜" to realize a desirable flexibility both in a horizontal dimension, i.e., flexibility of the distance between the caudal ends of the open heel, and in a vertical dimension, e.g., each vertical end may flex with one hoof side, for example, when stepping on a stone that contacts only part of the hoof.

The benefit of flexing and moving with the foot is achieved with the therapeutic extension horseshoe, as explained in detail above. That is, the resilient moldable material (for example, urethane or hybrid polyurethane) and the reinforcer act in the same way as in the non-therapeutic horseshoes. As mature horses benefit from the inventive horseshoe described above, the properties are even more important in horseshoes worn by young growing horses.

As described above, using extensions made of acrylic material is known. A DVM or farrier applies and builds up material around the hoof wall to create a platform, instead of using an extension horseshoe. Such method, however, can be detrimental to the integrity of the hoof wall resulting in a possible flare and wall separation. The therapeutic extension horseshoe provides support across the entire hoof, minimizing distortion to the hoof capsule.

It should be noted that in the above embodiments, the reinforcer is shown to extend into the lateral or medial extension, and connected therein to the wear inserts. The invention however, is not limited to such embodiments. That is, the reinforcer may form the shape of therapeutic extension horseshoe as in the embodiments described in cooperation with FIGS. 1-14, where only the wear insert(s)/vertical studs are disposed in the extension. In a case where the wear insert(s)/vertical studs are connected to the reinforcer, prong extensions are welded at one end to the reinforcer and at its other end to each insert/stud.

As can be seen in the drawing figures, the extension part of the therapeutic extension horseshoe is exaggerated and due to the material the shoe can be modified, i.e. thickness reduced, extension reduced or bevelled, in any area the vet/farrier sees fit for the individual case. It should be apparent that the vet/farrier can further shape the therapeutic extension horseshoe, and in particular the extension in order to address the needs of the young or newborn horse being treated.

For example, the invention anticipates a method of manufacturing a substantially u-shaped horseshoe from a resilient, flexile moldable material formed to have an ungulate surface and a contact surface, between which ungulate and contact surfaces is embedded: a pliable, metal rod-like reinforcer defined by an anterior segment from which opposing side segments continuously extend to caudal ends separated as an open heel and a hardened wear insert connected to the reinforcer at the anterior segment and arranged to extend vertically upward from the reinforcer to the crowned ungulate surface to imbue both flexibility and enhanced wear resistance at the anterior segment.

The method comprises acts of preparing a moldable composition of the moldable material, such as polyurethane, to realize the resilient, flexile moldable material; suspending the reinforcer and wear insert in a mold, wherein the mold defines and limits the rod-like reinforcer to continuously extend from the anterior segment though the opposing side segments to the caudal ends separated as the open heel within the surrounding volume of the resilient, flexile moldable material defining the ungulate and contact surfaces; introducing said moldable composition into said mold under predetermined molding conditions and removing said horseshoe when integrally formed with said reinforcer and wear insert embedded therein.

The invention includes a therapeutic extension horseshoe formed in a substantially u-shape from a resilient, flexile moldable material that is non-metallic. The shoe comprises a pliable, metal rod-like reinforcer shaped to include an anterior segment from which opposing side segments continuously extend to caudal ends separated as an open heel, said reinforcer embedded in the moldable material between ungulate and contact surfaces, wherein an extension is formed in the moldable material comprising one of said opposing side segments to extend a load bearing surface formed in said one opposing side segment in order to facilitate a modification of a posture of a horse shod therewith; and at least one wear insert arranged in said extension between the ungulate and contact surfaces to minimize surface wear to the moldable material therein.

The therapeutic extension horseshoe is configured to that the at least one wear insert is arranged in said extension is integrally connected to said reinforcer. Alternatively, the at least one wear insert is welded to said reinforcer.

In another embodiment, the invention provides a method of manufacturing a therapeutic extension horseshoe comprising a pliable, metal rod-like reinforcer embedded in a resilient, flexile moldable material, molded in a substantially u-shape as an anterior segment from which opposing side segments continuously extend to caudal ends separated as an open heel, wherein the material in which one of the side segments is embedded is formed to include an extension, and wherein at least one wear insert is embedded in the material forming the extension and arranged to extend vertically between ungulate and contact surfaces to imbue both flexibility and enhanced wear resistance at the extension.

The method comprising acts of preparing a moldable composition of the moldable material, such as polyurethane, to realize the resilient, flexile moldable material, suspending the reinforcer and said at least one wear insert in a mold that defines a horseshoe anterior segment extending continuously as opposing side segments, including the extension, to the caudal ends separated as the open heel, the mold and surrounding volume of the resilient, flexile moldable material defining the ungulate and contact surfaces in the substantially U-shape, introducing said moldable composition into said mold under predetermined molding conditions and removing said therapeutic extension horseshoe when integrally formed with said reinforcer and said at least one wear insert embedded within said extension.

Therapeutic Support Horseshoe

In another embodiment, the invention provides a therapeutic support horseshoe 300, as shown in FIGS. 26-32.

The therapeutic support horseshoe 300 is formed of a resilient, flexile moldable material formed in a U shape with an anterior segment 312 from which opposing first 314 and second 314' side segments continuously extend to opposing caudal ends 316, 316' separated as an open heel. A pliable, metal rod-like reinforcer 328 is embedded in the flexile moldable material (comprising the therapeutic support horseshoe) between opposing hoof-contacting 318 and ground-contacting 320 surfaces. The reinforcer 328 extends from one caudal end 316 through the anterior segment 312, to the other caudal end 316' of the horseshoe 300.

The horseshoe 300 includes an inner side surface 324 and an outer side surface 326 between the opposing hoof-contacting 318 and ground-contacting 320 surfaces. The horseshoe 300 includes a slot 327 formed in the inner side surface 324, approximately halfway between the opposing hoof-contacting 318 and ground-contacting 320 surfaces, and extending from the one caudal end 316 to the other caudal end 316'.

In an embodiment, the slot 327 is substantially rectangular as shown. The rectangular slot depicted is approximately 4 mm deep and 4 mm wide, but these dimensions vary based on the overall size of the shoe. The dimensions may vary from 1 mm to 8 mm in either of the slot dimensions. Also, while the slot is shown in the figures as substantially rectangular, the inventive therapeutic support horseshoe is not limited to a slot formed to be substantially rectangular. The slot may take any form that allows for the formation of a rim or flange when a pour-in pad or impression material is added to the shoe.

The therapeutic support horseshoe 300 further comprises a "rolled toe" configuration 329, as shown. A "rolled toe" or a "rolled toe" configuration 329 as shown operates to control breakover. The severity of the slope of the ground-contacting surface 320 at the anterior segment 312, between the inner 324 and outer 326 side surfaces, defines the break. One way of defining the slope is a difference between heights of the outer 326 and inner 324 side surfaces between the ground-contacting 320 and hoof-contacting 318 surfaces. The ground-contacting surface 320 slopes up towards the outer side surface 326 at the anterior segment 312 thereby forming the rolled toe 329.

Please further note the overall shape of the therapeutic support horseshoe as shown in FIGS. 27a, 27c, 28b, 30, 32b and, 32c depicts a wedge shape that is defined by the difference in height between the hoof-contacting surface 318 and the ground-contacting surface 320 as it increases towards the caudal ends 316, 316'.

Preferably such a slope is characterized by a 1°-3° wedge. FIG. 28b highlights the effect on bone alignment with a therapeutic support horseshoe installed in comparison to FIG. 28a without a horseshoe installed. The axial line 330 defines this bone alignment. Axial line 332 depicts the change in bone alignment in response to adding a wedged shoe. Axial line 334 defines where the rolled toe 329 aligns directly beneath the anterior coronary band. The therapeutic support horseshoe 300 includes a sole support device 336 provided between the caudal ends 316, 316', at least part 338 of which sole support device 336 is received in the slot 327. The part 338 may be said to comprise a flange, a rim or a collar.

Preferably, the sole support device 336 comprises a pour-in pad or an impression material. The pour-in pad comprises a two-part liquid that is mixed and dispensed proximate a sole of a horse's hoof using a dispensing gun and mixing tip. The impression material preferably comprises silicone-based putty.

For that matter, the impression material or pour-in pad may include a spring 340, at least part 342 of which spring device is received in the slot (see FIG. 31c). The spring device is formed in a "V" shape ending in sharpened points (342) to secure the spring in position, preferably in the slot 327. The spring comprises resilient spring steel, approximately ⅛" in diameter. The spring provides outward pressure to the caudal ends of the therapeutic support horseshoe.

In the embodiment shown, the slot enhances the longevity of the pour-in pad or impression material within the therapeutic support horseshoe once applied to the active horse.

The invention provides another embodiment of the therapeutic support horseshoe 300' in FIGS. 32a-c; Therapeutic support horseshoe 300' further comprises inserts 344 embedded in the flexile, moldable material for receiving metal protruding studs 346, which extend from the ground contacting surface 320. For that matter, the inserts 344 and studs 346 are machined as shown to enable the studs to be inserted into and connected to the inserts.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:
1. A therapeutic support horseshoe comprising:
 a resilient, flexile moldable material formed in a U shape with an anterior segment from which opposing first and second side segments continuously extend to opposing caudal ends separated as an open heel; and
 a pliable, metal rod-like reinforcer embedded in the flexile moldable material between opposing hoof-contacting and ground-contacting surfaces, the reinforcer extending from one caudal end, through the anterior segment, to the other caudal end of the horseshoe;
 wherein the horseshoe so formed includes an inner side surface and an outer side surface between the opposing hoof-contacting and ground-contacting surfaces; and
 wherein the horseshoe so formed includes a slot formed in the inner side surface, approximately halfway between the opposing hoof-contacting and ground-contacting surfaces, and extending from the one caudal end to the other caudal end.

2. The therapeutic support horseshoe as defined in claim 1, wherein the slot is cut into the inner side surface.

3. The therapeutic support horseshoe as defined in claim 2, further comprising a sole support device provided between the caudal ends, at least part of which sole support device is received in the slot.

4. The therapeutic support horseshoe as defined in claim 3, wherein the sole support device comprises a pour-in pad.

5. The therapeutic support horseshoe as defined in claim 4, wherein the pour-in pad conforms to a hoof of a horse upon which the pour-in pad is applied.

6. The therapeutic support horseshoe as defined in claim 3, wherein the sole support device comprises an impression material, the impression material comprising silicone-based putty.

7. The therapeutic support horseshoe as defined in claim 3, wherein the sole support device comprises a spring.

8. The therapeutic support horseshoe as defined in claim 1, wherein the slot is substantially rectangular.

9. The therapeutic support horseshoe as defined in claim 1, wherein the slot is approximately 4 mm deep and 4 mm wide.

10. The therapeutic support horseshoe as defined in claim 1, further comprising a rolled toe, wherein a height of the inner side surface is greater than a height of the outer side surface.

11. The therapeutic support horseshoe as defined in claim 10, wherein the ground-contacting surface slopes up towards the outer side surface at the anterior segment thereby forming the rolled toe.

12. The therapeutic support horseshoe as defined in claim 1, wherein a height or depth dimension of the therapeutic support horseshoe increases linearly between the outer side surface at the anterior segment and the caudal ends.

13. The therapeutic support horseshoe as defined in claim 1, wherein the sole support device includes any of the group consisting of a flange, a rim and a collar.

14. The therapeutic support horseshoe as defined in claim 1, further comprising inserts embedded in the flexile, moldable material for receiving metal protruding studs to extend from the ground contacting surface.

15. The therapeutic support horseshoe as defined in claim 14, wherein the inserts and studs are machined to enable the studs to be inserted into and connected to the inserts.

* * * * *